US007111285B2

(12) United States Patent
Smith et al.

(10) Patent No.: US 7,111,285 B2
(45) Date of Patent: Sep. 19, 2006

(54) METHOD AND SYSTEM FOR PROTECTING SOFTWARE APPLICATIONS AGAINST STATIC AND DYNAMIC SOFTWARE PIRACY TECHNIQUES

(75) Inventors: Michael D. Smith, Lexington, MA (US); Vasanth Bala, Tarrytown, NY (US)

(73) Assignee: Liquid Machines, Inc., Waltham, MA (US)

( * ) Notice: Subject to any disclaimer, the term of this patent is extended or adjusted under 35 U.S.C. 154(b) by 819 days.

(21) Appl. No.: 10/197,063

(22) Filed: Jul. 16, 2002

(65) Prior Publication Data

US 2003/0018906 A1 Jan. 23, 2003

Related U.S. Application Data

(60) Provisional application No. 60/306,088, filed on Jul. 17, 2001.

(51) Int. Cl.
*G06F 9/45* (2006.01)
*G06F 9/00* (2006.01)
*G06F 7/04* (2006.01)
*G06F 11/30* (2006.01)

(52) U.S. Cl. .............. 717/140; 726/21; 726/30; 713/189

(58) Field of Classification Search ............... 713/167, 713/190; 705/51, 55, 56; 726/23, 33
See application file for complete search history.

(56) References Cited

U.S. PATENT DOCUMENTS

| 5,421,015 A | 5/1995 | Khoyi et al. |
| 5,485,600 A | 1/1996 | Joseph et al. |
| 5,805,800 A | 9/1998 | Kotani et al. |
| 5,925,100 A | 7/1999 | Drewry et al. |
| 5,953,534 A | 9/1999 | Romer et al. |
| 5,995,969 A | 11/1999 | Lee et al. |
| 6,006,328 A * | 12/1999 | Drake .................... 726/23 |
| 6,141,698 A | 10/2000 | Krishnan et al. |
| 6,158,049 A | 12/2000 | Goodwin et al. |
| 6,173,283 B1 | 1/2001 | Kasso et al. |
| 6,247,127 B1 | 6/2001 | Vandergeest |
| 6,263,491 B1 | 7/2001 | Hunt |
| 6,301,660 B1 | 10/2001 | Benson |
| 6,317,868 B1 | 11/2001 | Grimm et al. |
| 6,330,691 B1 | 12/2001 | Buzbee et al. |

(Continued)

FOREIGN PATENT DOCUMENTS

EP 0 803 789 A2 10/1997

(Continued)

OTHER PUBLICATIONS

Collberg, C., et al., "A Taxonomy of Obfuscating Transformations," (Report No. 148). Department of Computer Science, The University of Auckland: Auckland, New Zealand, Jul. 1997.

(Continued)

*Primary Examiner*—Wei Zhen
*Assistant Examiner*—Chih-Ching Chow
(74) *Attorney, Agent, or Firm*—Hamilton, Brook, Smith & Reynolds, P.C.

(57) ABSTRACT

An application module is rewritten by overwriting executable code at identified authorization points with control transfers to a managed challenge system such that a rewritten application module results. The managed challenge system is constructed to include the overwritten executable code, and performs an authorization check upon acquiring control from an authorization point. The managed challenge system is linked to the rewritten application module.

81 Claims, 12 Drawing Sheets

U.S. PATENT DOCUMENTS

| | | | |
|---|---|---|---|
| 6,381,735 B1 | 4/2002 | Hunt | |
| 6,389,402 B1 | 5/2002 | Ginter et al. | |
| 6,405,316 B1 | 6/2002 | Krishnan et al. | |
| 6,427,140 B1 | 7/2002 | Ginter et al. | |
| 6,430,561 B1 | 8/2002 | Austel et al. | |
| 6,487,646 B1 | 11/2002 | Adams et al. | |
| 6,499,137 B1 | 12/2002 | Hunt | |
| 6,519,700 B1 | 2/2003 | Ram et al. | |
| 6,615,350 B1 * | 9/2003 | Schell et al. | 713/168 |
| 6,629,123 B1 | 9/2003 | Hunt | |
| 6,658,658 B1 | 12/2003 | Jones et al. | |
| 6,668,325 B1 * | 12/2003 | Collberg et al. | 713/194 |
| 6,681,212 B1 * | 1/2004 | Zeng | 705/51 |
| 6,681,331 B1 * | 1/2004 | Munson et al. | 726/23 |
| 6,711,687 B1 | 3/2004 | Sekiguchi | |
| 6,775,655 B1 | 8/2004 | Peinado et al. | |
| 6,779,154 B1 | 8/2004 | Nussbaum et al. | |
| 6,801,999 B1 * | 10/2004 | Venkatesan et al. | 713/167 |
| 6,802,006 B1 | 10/2004 | Bodrov | |
| 6,874,139 B1 | 3/2005 | Krueger et al. | |
| 6,885,748 B1 | 4/2005 | Wang | |
| 6,895,444 B1 | 5/2005 | Weisshaar et al. | |
| 6,920,567 B1 | 7/2005 | Doherty et al. | |
| 6,952,800 B1 | 10/2005 | Danner et al. | |
| 6,957,422 B1 | 10/2005 | Hunt | |
| 6,965,996 B1 | 11/2005 | Hirano et al. | |
| 6,976,249 B1 | 12/2005 | Stattenfield | |
| 6,988,271 B1 | 1/2006 | Hunt | |
| 2001/0010046 A1 | 7/2001 | Muyres et al. | |
| 2002/0016918 A1 * | 2/2002 | Tucker et al. | 713/190 |
| 2002/0049603 A1 | 4/2002 | Mehra et al. | |
| 2002/0065849 A1 | 5/2002 | Ferguson et al. | |
| 2002/0069399 A1 | 6/2002 | Miloushev et al. | |
| 2002/0083318 A1 | 6/2002 | Larose | |
| 2002/0120924 A1 | 8/2002 | Miloushev et al. | |
| 2002/0129054 A1 | 9/2002 | Ferguson et al. | |
| 2002/0141582 A1 | 10/2002 | Kocher et al. | |
| 2002/0141584 A1 | 10/2002 | Razdan et al. | |
| 2002/0161996 A1 | 10/2002 | Koved et al. | |
| 2002/0178244 A1 | 11/2002 | Brittenham et al. | |
| 2002/0178254 A1 | 11/2002 | Brittenham et al. | |
| 2003/0056205 A1 | 3/2003 | Miloushev et al. | |
| 2003/0061566 A1 | 3/2003 | Rubstein et al. | |
| 2003/0135850 A1 | 7/2003 | Miloushev et al. | |
| 2004/0044779 A1 | 3/2004 | Lambert | |
| 2004/0205690 A1 | 10/2004 | Pieper | |
| 2004/0205720 A1 | 10/2004 | Hundt | |

FOREIGN PATENT DOCUMENTS

| | | |
|---|---|---|
| EP | 0 895 148 A1 | 2/1999 |
| WO | WO99/01815 | 1/1999 |

OTHER PUBLICATIONS

Kessler, P., "Fast Breakpoints: Design and Implementation." Paper presented at the ACM SIGPLAN '90 Conference on Programming Language Design and Implementation, White Plains, NY (Jun. 20-22, 1990).

"Intel Architecture Software Developer's Manual" (vol. 2: Instruction Set Reference) [online], 1997. Retrieved from the Internet <URL: http://developer.intel.com/design/pentium/manuals/24319101.pdf>.

* cited by examiner

METHOD AND SYSTEM FOR PROTECTING SOFTWARE APPLICATIONS AGAINST STATIC AND DYNAMIC SOFTWARE PIRACY TECHNIQUES

RELATED APPLICATIONS

This application claims the benefit of U.S. Provisional Application No. 60/306,088, filed Jul. 17, 2001. The entire teachings of the above application(s) are incorporated herein by reference.

BACKGROUND

As enterprises rely more and more heavily on computers and electronic transactions for their daily business, there is an increasing demand for technologies that can secure these systems, their applications, and their associated digital content from unauthorized use and distribution. A "licensed application" may be considered to be an application that is meant to be protected from unauthorized use and distribution; "protected content" is digital data that is desired to be similarly secured. Unlike the mechanical engines and material outputs of physical systems, it is difficult to secure applications and digital content because both are easily copied, altered, distributed, and ultimately misused.

For purposes of discussion, a "license" comprises the authorized rights of an end user with respect to the protected material. A license often comprises a use agreement and one or more digital values that help enforce the terms of that agreement. The term "license file" is used herein to distinguish these digital values from the more general notion of an end-user's rights, though the tangible form of said values and their associated authorizations need not be a traditional computer file. Furthermore, the protected material may be encrypted.

License files are used by industry as part of the runtime authorization mechanisms used to enforce use agreements on an end user's system and ultimately to thwart piracy. The focused goal of piracy is license subversion: the successful execution of a licensed application, a licensed application module, or an application manipulating protected content without a valid license. In some application domains, the license enforcement system is also called an authorization system, and the goal of license subversion is to bypass the runtime authorization mechanisms. Conversely, the goal of those in the domain of software protection is runtime license enforcement.

The practice of runtime license enforcement commonly involves an application module, a license file, and two additional software entities that together comprise the actual, software-based license enforcement system. (Although it is possible to build hardware-based license enforcement systems, such systems are rare because they require specialized memory or processing resources that are not generally or widely available.)

FIG. 1 is a block diagram illustrating the relationship between the four entities typically involved in license enforcement.

The application module A 2 in FIG. 1 may be a piece of a larger application, or it may comprise the entire application. The license file L 10 authorizes an end user to execute the application module A 2 (i.e., as a licensed application), or it may enable the application module A 2 to access or manipulate protected content in a data file (not shown).

The challenge system C 6 provides mechanisms for controlling execution of the application module A 2. It interacts with the response system R 8 to verify that an end user has the right to execute the application module A 2, and it prevents further program execution whenever authorization fails.

The response system R 8 reacts to a verification request from the challenge system C 6 by reading, validating, or in some way interacting with the license file L 10. Effective, software-based license enforcement systems generally contain all of the logical components illustrated in FIG. 1.

The challenge system C 6 and the response system R 8 together make up the license enforcement system 4, also called an authorization system.

It should be emphasized that FIG. 1 is a conceptual representation of the entities involved in runtime license enforcement. In particular, application module A 2 should be viewed as the set of bits that implement all of the required functionality of A, except for that functionality required for protection from software piracy. In other words, application module A 2 does not include any capability for reading, validating, or more generally interacting with the license file L 10, nor does it have the capacity to affect its own execution based on the result of license validation.

SUMMARY

An embodiment of the present invention includes a software-based method that improves the security of both licensed applications and protected content.

Current security technologies provide only a partial solution to the problems of unauthorized use. Cryptographic techniques, for example, can be used to secure both applications and digital content, but they only secure applications and digital content while they reside on or travel through untrusted environments. The strong protection provided by cryptographic techniques ends at the point when a licensed application or protected content is decrypted.

Whether one is trying to protect a software application or digital content manipulated by such an application, a solution is needed that extends protection through program execution. In other words, mechanisms are needed to defend against changes enacted in applications for the purpose of subverting the runtime authorization mechanisms enforcing the protection around a licensed application or protected content.

The present invention addresses such acts of software piracy, including both static attacks (i.e., those made against applications as they reside on disk) and dynamic attacks (i.e., those made against the runtime memory image of applications).

Accordingly, the invention method for protecting a software application module includes rewriting the application module by overwriting executable code at identified authorization points with control transfers to a managed challenge system such that a rewritten application module results. The managed challenge system is constructed to include the overwritten executable code, and performs an authorization check upon acquiring control from an authorization point. Finally, the managed challenge system is linked to the rewritten application module.

The authorization points may be identified in the software application module, for example, by identifying or determining special pragmas used for code and/or data protection. These pragmas may be associated with the source code of the application module at the authorization points, for example as a separate file, or they may be directly embedded into or attached to the source code. A compiler may be modified or written to recognize the special pragmas, and to then perform the steps of rewriting, constructing and linking based on these pragmas. Each special pragma may comprise authorization check data for its associated authorization point.

Alternatively, authorization points may be identified by producing a set of associations between authorization points and authorization check data, where rewriting the application module is based on the set of associations.

Alternatively, authorization points may be identified by constructing a control flow graph for the application module, and analyzing the control flow graph to identify authorization points. The control flow graph may be either complete or incomplete. If incomplete, its coverage may be increased by tracing the execution of the application module under different input data sets.

A particular authorization check may be associated with an identified authorization point. Each control transfer may be uniquely identified.

A control transfer may be implemented with an instruction sequence comprising one or more instructions, where the instruction sequence causes a runtime exception. An address of the instruction sequence may be used to uniquely identify the control transfer. Control transfer may be accomplished, by an instruction sequence that contains, for example, an interrupt instruction, or a debug breakpoint instruction.

A control transfer may be implemented with a call to the managed challenge system. The call may include a return address that uniquely identifies the control transfer.

Furthermore, in the rewritten application module, the control transfers to the managed challenge system may be hidden. This may be done, for a particular identified authorization point, by selecting and removing a set of control transfers whose removal effectively makes finding the authorization point using static analysis impossible. This selecting and removing may be accomplished by removing control transfers until the possibility of reaching the authorization point is minimized. The control transfers to be removed may be selected using a control flow graph.

The set of control transfers may be selected such that any runtime overhead is minimized.

Removing one of the control transfers may be performed by further rewriting the application module by overwriting the control transfer with a control transfer instruction sequence, which may include one or more instructions, and transferring control, upon execution of the sequence, to the managed challenge system. The control transfer that was overwritten is then included in the managed challenge system.

Furthermore, where a byte sequence in the application module matches one of said control transfers but does not correspond with an identified authorization point, dummy code, to be associated with the byte sequence, may be included in the managed challenge system. For example, if the byte 0xCC (opcode for an INT 3 instruction in the Intel x86 instruction set) appears in the immediate field of another instruction, dummy code may be generated for it, so that an adversary looking at just the executable code could not tell that it was not an INT 3 instruction.

Execution or inclusion of the dummy code may be disabled if the byte sequence is a valid instruction. Including the dummy code may be responsive to a determination as to whether the byte sequence is part of another valid instruction.

Upon failure of the authorization check, a specified action may be performed, such as terminating execution of the application module, or requesting authorization information from a user.

Upon success of the authorization check, the included overwritten executable code may be executed and control returned to the application module.

The included overwritten executable code may be further modified to account for its displacement.

Furthermore, the included overwritten executable code may be combined with code for the authorization check into a single instruction sequence, for example, by merging the included overwritten executable code with the authorization check code by interspersing their respective instructions.

In addition, the executable code may be obfuscated within the managed challenge system.

Various code may be stored in a table in the managed challenge system. This code may include, but is not limited to: i) merged code sequences corresponding to authorization points in the application module; ii) hidden code sequences corresponding to removed control transfers in the application module; and/or iii) dummy code sequences corresponding to non-authorization point code sequences. The table may be indexed by a unique identifier associated with each control transfer in the application module.

Furthermore, any or all of the code stored in the table may be encrypted.

Upon transfer of control to the managed challenge system, an executable code sequence may be dynamically generated from an entry in the table corresponding to an identifier associated with the control transfer from which control was transferred to the managed challenge system. The generated executable code sequences may then be maintained in a code cache of the managed challenge system. The code cache itself may be intentionally sized such that it is not large enough to simultaneously contain all dynamically created code sequences, so that it is impossible for the entire application executable to exist in memory at any given time.

Any overhead due to the dynamic generation of an executable code sequence may be tracked. Based on such overhead tracking, a decision may be made as to whether to undo the rewriting of all or parts of the application module.

Where the steps of rewriting, constructing and linking are performed by a compiler, the compiler may create a shared object that includes the managed challenge system and that is linked with the rewritten application module.

The rewriting may be further be accomplished, without access to source code, by instrumenting the application module's executable code.

In one embodiment of the invention, the application module may be a content protection module.

Furthermore, different byte sequences may be used to transfer control to the managed challenge system from different authorization points in the application module.

A system for protecting a software application module according to the present invention includes a coupling tool and a coupling agent template. The coupling tool rewrites the application module to form a modified application module by overwriting executable code at identified authorization points with control transfers to a managed challenge system. The coupling tool also creates the managed challenge system, and links the managed challenge system to the rewritten application module. The managed challenge system may include the overwritten executable code, executable code from a challenge system, a runtime task table and a coupling agent for managing the managed challenge system. The runtime task table associates the identified authorization points with authorization check data and with the overwritten code. The authorization check data describes an authorization check from the challenge system to be performed upon control reaching the associated authorization point. The coupling agent may be produced from a specialization of the coupling agent template.

The system may further include a protected code store, in which the coupling tool stores any combination of, but is not limited to: i) merged code sequences corresponding to authorization points in the application module; ii) hidden code sequences corresponding to removed control transfers in the application module; and iii) dummy code sequences corresponding to non-authorization point code sequences. Any of the merged code, hidden code and/or dummy code sequences may be encrypted.

In one embodiment, the coupling agent includes a dynamic code generator which generates an executable code sequence on demand at runtime from a stored code sequence corresponding to an identifier associated with a control transfer from which control was transferred to the managed challenge system.

The coupling agent may further include a code cache for storing generated code sequences, and a cache management module which manages the code cache.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A description of preferred embodiments of the invention follows.

A goal of the present invention is to create a secure execution environment where the protected material (be it a licensed application or protected content manipulated by an application) is used only within the constraints imposed by the use agreement.

Embodiments of the present invention are independent of the actual process used to secure the protected material prior to execution by a licensed user.

An embodiment of the present invention applies to all of the runtime license enforcement systems associated with different kinds of protected material. For ease of discussion, the license is said to protect access to a licensed application module A 2, although this should not be interpreted as limiting the scope of the invention.

Figure 1:
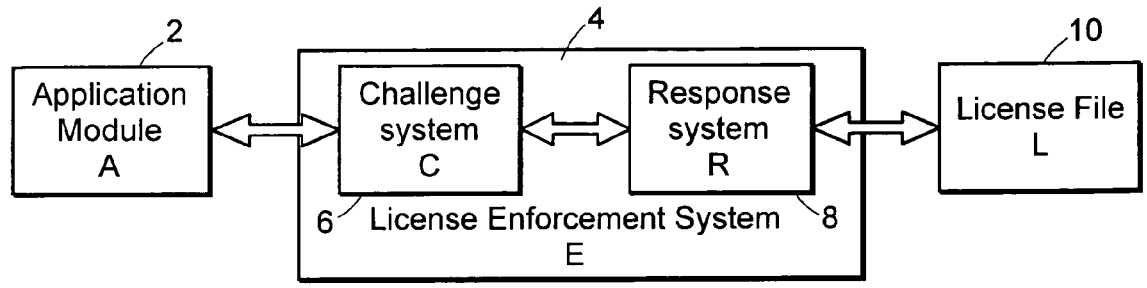
FIG. 1 is a block diagram illustrating the relationship between the four entities typically involved in license enforcement.

With application module A 2 characterized as above with respect to FIG. 1, it is possible to separate completely the engineering and/or development of the application module A 2 from the manner in which A is licensed. The reader should avoid falling victim to the common misconception, found in much of the prior art, that source code changes in the application are required for an effective, software-based license enforcement scheme.

In fact, a common trait of most if not all prior art is that these existing schemes can only make license subversion more difficult by increasing the coupling between the source code of the application module and the runtime license enforcement system. Unfortunately, any increase in said coupling impacts the development of application module A and makes authorization an attribute impacting application development.

Crucial Aspects of an Effective License Enforcement System

In general, an effective method for securing licensed applications and protected content against piracy is one that makes license subversion difficult. In particular, such a method must achieve the following two goals:

Goal g1: It must be very difficult to execute a licensed application module successfully without a valid license or make a copy of said application module that can execute successfully.

Goal g2: It must be very difficult for an unauthorized person to obtain or duplicate a valid license.

In addition, any effective solution, to be commercially viable, must address issues beyond those directly involved in thwarting license subversion. In particular, a viable method for piracy protection must not only be effective, but must in addition achieve the following two supplementary goals:

Goal g3: It must be very easy for an authorized person to obtain a valid license and use that license to exercise his or her entitled rights.

Goal g4: It must be very easy for the application module developer to separate the details and overhead of licensing from the software development and runtime performance of the licensed application module.

Issues of effectiveness are always the first focus of attention, after which the additional issues concerning commercial viability may be addressed. Prior art may be categorized as providing an effective solution for (g1), (g2), or both (g1) and (g2). This categorization is important because different technologies can be applied to solve (g1) and (g2). Done properly, solutions can be mixed and matched to build a viable license enforcement system.

Authorization Check and Common Attacks

Figure 2:
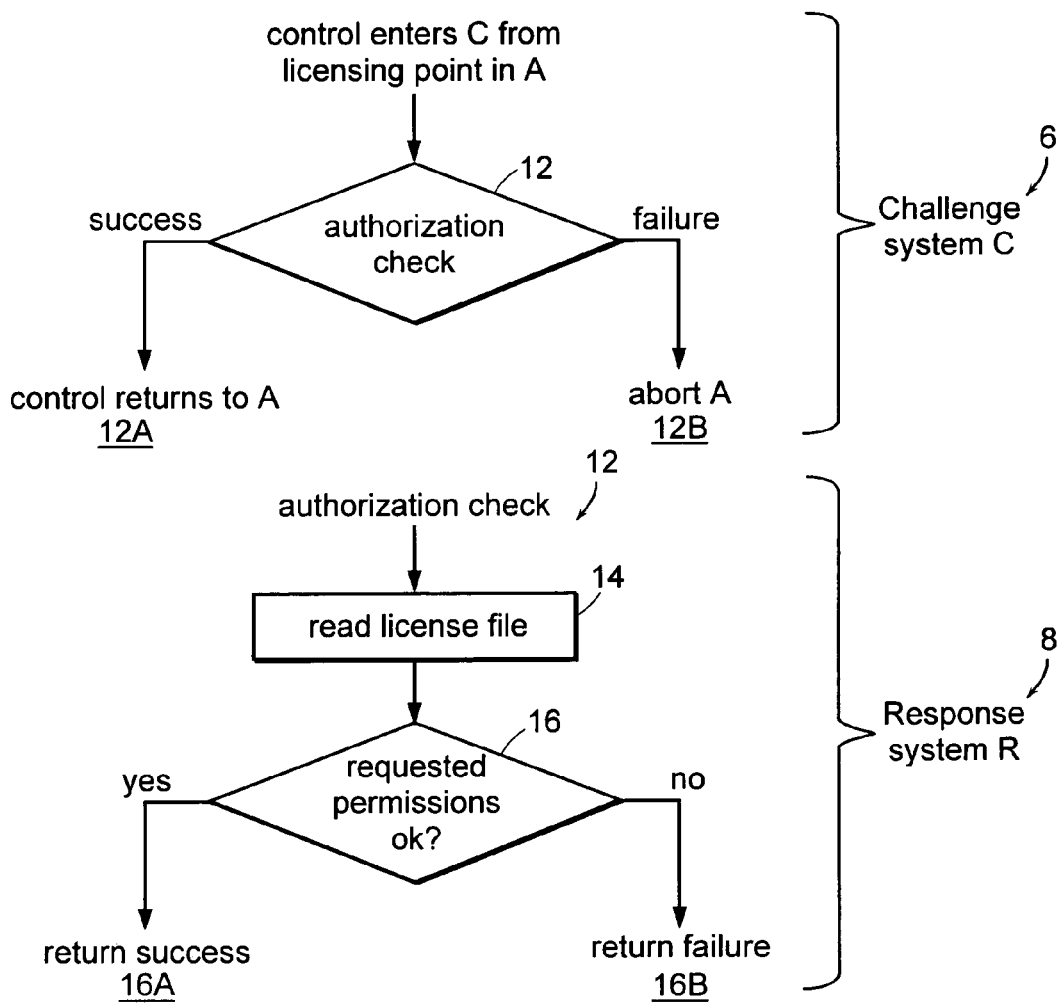
FIG. 2 is a flowchart illustrating the minimum work done by a license enforcement system during an application run to determine whether an end user has the right to continue to execute said licensed application module.

FIG. 2 is a flowchart illustrating the minimum work done by a license enforcement system during an application run to determine whether an end user has the right to continue to execute said licensed application module. The flow of control exits the application module code at a licensing point and enters the Challenge System C 6. This system 6 then invokes (step 12) the appropriate authorization function in the Response System R 8, and depending upon the outcome of that function, it either allows execution to continue (at 12A) or aborts the application (at 12B).

Upon invocation by C 6, the response system R 8 reads the license file (step 14), checks to see if the end user has the right to perform the requested action (step 16), and returns the result (e.g., success 16A/failure 16B) of this check to the challenge system C 6.

Effective license enforcement systems are based on the assumption that the enduser system is a hostile environment. For purposes of discussion, a person trying to subvert the license enforcement system 4 (FIG. 1) is referred to as an "adversary". When a licensed application module A 2 is running, an adversary has the ability to change or mask out the steps shown in FIG. 2 as well as intercept and spoof communications between the entities (2, 6, 8 and 10) of FIG. 1.

These actions need not be taken directly by an adversary, but may be performed by a program (e.g., a virus) working on behalf of the adversary. One license enforcement system is generally considered to be more effective than another if the first said system is better able to guard against all such attacks. The following describes how others have protected against such attacks.

Protecting the License File

A significant portion of existing art focuses on effective solutions to (g2), i.e., identifying a method that makes it very difficult for an adversary to obtain or duplicate a valid license.

Figure 3:
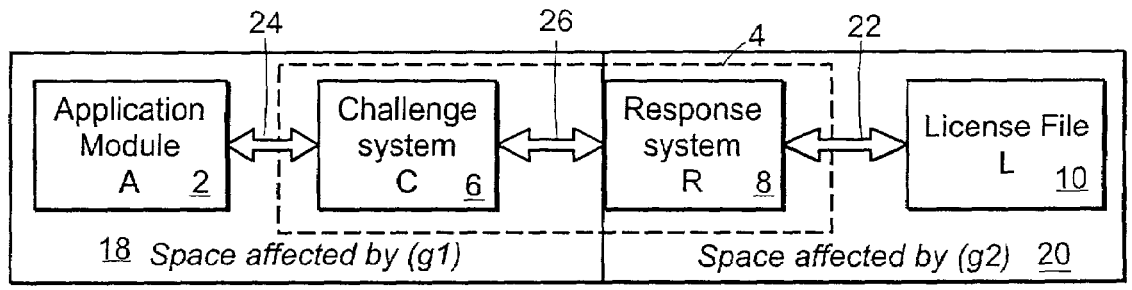
FIG. 3 is another view of the entities of FIG. 1, mapping license enforcement goals onto the entities and channels in the license enforcement system.

FIG. 3 is another view of the entities of FIG. 1, mapping license enforcement goals g(1) and g(2) onto the entities and channels in the license enforcement system 4. FIG. 3 illustrates that achieving goal g2, i.e., space 20, involves protecting the response system R 8, the license file L 10, the channel 22 between R 8 and L 10, and the channel by which L 10 is obtained (not shown).

The most effective methods addressing goal g2 often tie L 10 to one or more unique values associated with a piece of hardware (e.g., a processor, disk, dongle, or smart card) and a secret passphrase known only to the authorized user associated with said hardware. Effective license enforcement starts by encoding the unique and secret values into L 10 at a trusted site out of the view of the potential adversary. Then, during authorization check, response system R 8 extracts and matches said values with the value provided by the current user and hardware. This approach makes it difficult for an unauthorized person to subvert the authorization check by obtaining or duplicating a valid license.

Preventing Execution

Relatively little existing art, on the other hand, deals with goal g1, i.e., identifying a method that makes it very difficult to execute a licensed application module successfully without a valid license or make a copy of said application module that can execute successfully. As seen in FIG. 3, goal g1 involves a method for protecting the application image A 2 on disk and in memory, the channel 24 between A 2 and C 6, the challenge system C 6, and the channel 26 between C 6 and R 8.

A key aspect of goal g1, as illustrated in FIG. 2, is to provide the license enforcement system 4 with the ability to affect A's 2 execution depending upon the outcome of an authorization check 12 (FIG. 2). Though existing art provides for this ability in one of two ways as described below, it has to date proven difficult to protect this part of the license enforcement system 4 from adversaries with the same strong guarantees that have been achieved for protecting the license file L 10.

Controlled Launch

A simple approach requires the end user (either implicitly or explicitly) to launch the license enforcement system 4, which performs an authorization check before launching A 2. For example, Macrovision Corporation and Rainbow Technologies, Inc., provide these capabilities in their software copy protection and electronic license management products. In order for this type of approach to be effective, it must be difficult for an adversary to launch A 2 without the license enforcement system 4.

Cryptographic techniques are only partially effective, because even if the disk image of the A 2 is encrypted, its memory image cannot be. (Executing the encrypted memory image requires specialized hardware support.) However, to obtain an unprotected copy of A 2, an adversary may simply wait until A 2 has been launched and then copy its memory image.

Embedding License Enforcement into the Licensed Application Module

Figure 4:
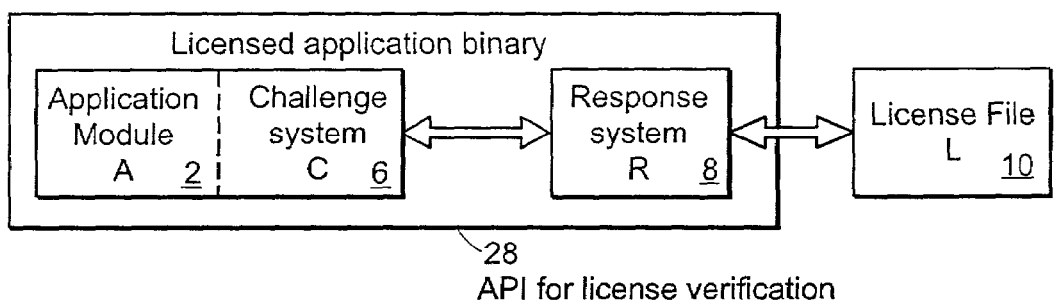
FIG. 4 is a block diagram illustrating an application programmer interface (API) approach to license enforcement.

FIG. 4 illustrates a more effective solution. Here, the application module developer embeds, into A 2, calls (i.e., challenges) to the authorization check routines in R 8. As before, R 8 must return an appropriate response that is checked by additional code embedded in A 2. An incorrect response causes A 2 to abort. These calls and the corresponding code that acts upon the response comprise the challenge system C 6 described earlier in FIG. 2.

Prior art supports such an approach by providing an application programming interface (API) 28 for licensing and license protection. Macrovision Corporation's FLEXlm product is one example of a popular API. Such APIs encapsulate the functionality of R 8 within one or more statically or dynamically linked libraries and thus minimize the impact of the complexity of R's functionality on the developer of A 2. On the other hand, the application developer is responsible for creating the source code for C 6 and directly embedding that code into the source code for A 2.

Since license enforcement is only as effective as the weakest link in the chain of protection, the effectiveness of the approach shown in FIG. 4 depends upon the application developer's ability to protect the challenge code embedded into A 2. In other words, an adversary most often does not try to reverse engineer R 8 or break the encryption scheme protecting L 10—he simply identifies each challenge point in A 2 and either (a) replaces the call to the authorization check with a call to a routine that always returns "success"; or (b) overwrites the code that processes the response from the authorization check so that it never aborts the application module.

To defend against these kinds of attacks, the application module developer can make it difficult to identify all of the challenge points in A 2 and remove the effect of these challenge points without destroying the functionality of A 2.

Unfortunately, if an application module developer uses the straightforward challenge template illustrated in FIG. 2, very little protection is achieved even from the insertion of multiple authorization checks. This is because it is fairly easy, using commonly available debugging and executable-inspection tools, for a programming-savvy adversary to identify and rewrite challenges built in such a straightforward manner.

To protect against such programming-savvy adversaries, other techniques, commonly called code obfuscation, have been employed that make it more difficult to separate and remove the challenge code C 6 from the code for A 2. "Code obfuscation" involves a tight intertwining of the challenge and application module code in a manner that makes the two practically indistinguishable. See, for example, Christian Collberg et al., "A Taxonomy of Obfuscating Transformations," Technical Report #148, Department of Computer Sciences, The University of Auckland, July 1997 (www.cs.arizona.edu/~collberg/Research/Publications/CollbergThomborsonLow97a/ind ex.html).

Despite the growing concern about software piracy, code obfuscation lacks widespread adoption because it incurs a heavy penalty on the engineering, testing, and often the performance of the licensed application. Code obfuscation is in direct conflict with goal g4. Stated another way, the difficulty of hiding said challenges in A 2 makes goal g1 a difficult problem to solve effectively and an even harder problem to solve viably.

In summary, an effective solution for goal g1 must thwart piracy attempts based on static analysis of the application module's A 2 code, runtime observation of its memory image, and runtime interception of the license verification checks 12. And to be commercially successful, any practical solution must not sacrifice goals g3 and g4 to achieve greater levels of software protection.

Overview

The present invention provides an alternative solution for runtime license enforcement that makes it provably hard to subvert the protection scheme and create an unencumbered copy of a licensed application or application module. In particular, an embodiment of the present invention comprises a new method for preventing the successful unauthorized execution of a licensed application module (goal g1).

Figure 5:
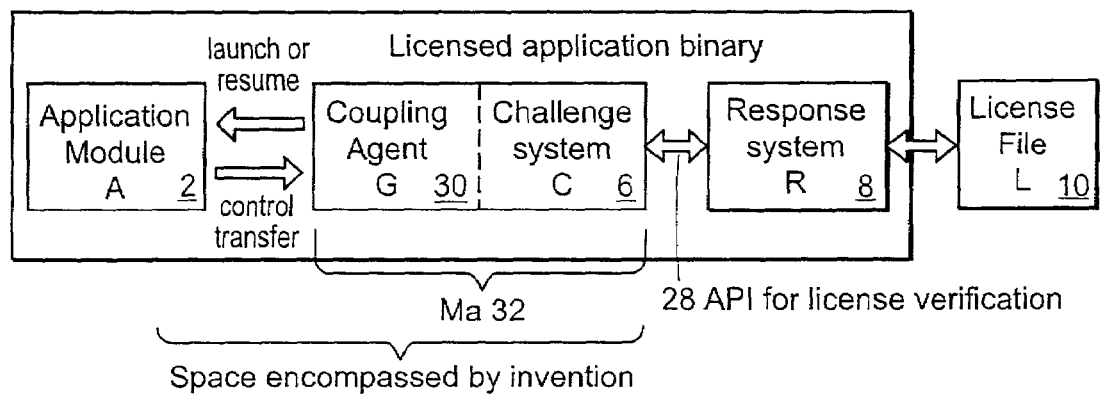
FIG. 5 is a block diagram illustrating the positioning of an embodiment of the present invention.

The invention does not require any engineering changes to the licensed application's A 2 source code, nor does it incur any noticeable impact on the runtime performance of said application (goal g4). Viewed broadly, the present invention solves the larger problem of licensing and piracy protection because said invention can be integrated, as illustrated in FIG. 5, with any of the previously mentioned methods for obtaining, protecting, and accessing a license file L 10 (goal g2). As a result, the use of the present invention in a complete solution for license enforcement does not affect the ability of an authorized end user to obtain and use a valid license (goal g3). Thus, the focus is on how to inseparably integrate a given authorization scheme with a given application module without requiring any source-level changes to the application module, and not on the specifics of the authorization or licensing scheme itself.

FIG. 5 is a block diagram illustrating the positioning of an embodiment of the present invention. A new entity, the coupling agent G 30 has been added to the license enforcement system. The coupling agent G 30 sits between the application module A 2 and the challenge system C 6, and appears to an adversary to be an integral part of the software module implementing C 6. At a point in A 2 where an authorization check should occur, control is transferred from A 2 to G 30, and then from G 30 into code for C 6 that would have in prior art appeared as part of A 2. The software module comprising the integration of G 30 and C 6, along with some additional data described later, is referred to as the managed challenge system $M_a$ 32.

The managed challenge system $M_a$ 32 is specific to the given application module A 2 and will only work for that particular application module A 2. In contrast to the application module A 2, the source code for the coupling agent G is under the control of the implementer of the authorization scheme (who is likely different from the developer of the application), so such customization is feasible. Furthermore, the customization of the coupling agent G 30 for a given application and authorization scheme, described below, can be done automatically. Thus, creating a coupling agent G 30 for a given application module A 2 and authorization (or licensing) scheme is a fairly simple and automatic task.

Embodiments of the present invention naturally achieve the desired goal of separating an application's licensing from its development by allowing the implementation of the coupling agent G 30, and thus the challenge system C 6, to be separate from the source-level coding of the licensed application module.

Instead of integrating C 6 into A 2, an embodiment of the present invention embeds parts of A 2 (along with C 6) into the coupling agent G 30. The code removed from A 2 and executed in the coupling agent G 30 is referred to as the "hidden application code". As described below, a deep and secure embedding of the hidden application code within the coupling agent G 30 can be achieved without any more information than is provided in A's executable (i.e., without the aid of A's developer).

The following statements support the inventors' claims that the organization in FIG. 5 is effective against a skilled adversary:

First, by taking code from A 2 and integrating it into the coupling agent G 30, an adversary cannot create a working version of A 2 simply by removing the coupling agent G 30 from the licensed application module.

Second, by hiding the locations in A 2 where control is transferred to the coupling agent G 30 in such a manner that it is provably hard to identify them via static analysis (i.e., analysis of the licensed application module's executable, as opposed to the analysis of the loaded memory image of the application during its runtime execution), it becomes very difficult or even impossible for the adversary to build a working version of the licensed application from A 2 and the coupling agent G 30 alone. To find all licensing points, the adversary must exercise all possible control paths in the application, and this is related to the well-known, hard problem of code coverage analysis in the area of software testing.

Third, by obscuring the interaction between the coupling agent G 30 and the response system R 8, it becomes very difficult for the adversary to change how the application A 2 ultimately calls the authorization-check routines in R 8 and uses the results of these calls. The present invention has complete freedom in this area because this work is done entirely within the coupling agent G 30.

Finally, by making it hard for the adversary to understand how the code and data structures in the coupling agent G 30 are used during runtime execution to accomplish the work done on behalf of A 2 and C 6, it becomes very difficult for the adversary to change the coupling agent's code to thwart license enforcement.

Description

The process by which an embodiment of the present invention turns unlicensed applications into protected, licensed applications is now discussed. Methods are also presented for expanding the capabilities of the coupling agent beyond protection to achieve the commercially important goal of minimizing the overhead of protection. Although the descriptions are organized around the process of producing a licensed application module, the runtime functioning of the present invention is also explained.

Figure 6:
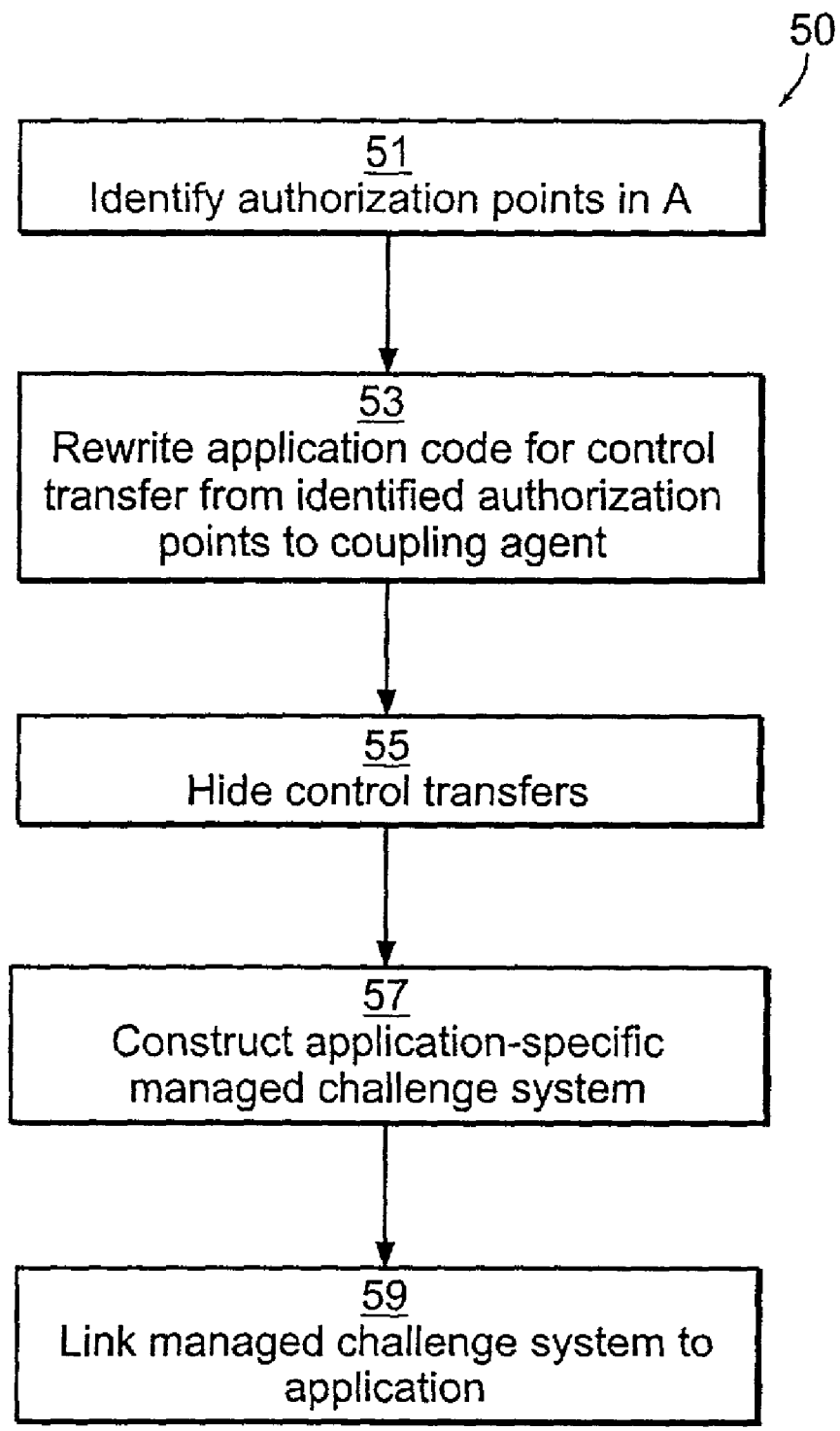
FIG. 6 is a flowchart outlining the process of producing a licensed application module according to the present invention.

FIG. 6 is a flowchart 50 outlining the process of producing a licensed application module according to the present invention. First, at step 51, authorization points are identified within the unlicensed application module A. Then, at step 53, the code at each of these identified authorization points is copied to a work area (i.e., temporarily stored), and the original code is automatically rewritten to invoke the coupling agent 30. Next, at step 55, a process makes these authorization points difficult to identify in the application module A using static analysis.

Figure 7:
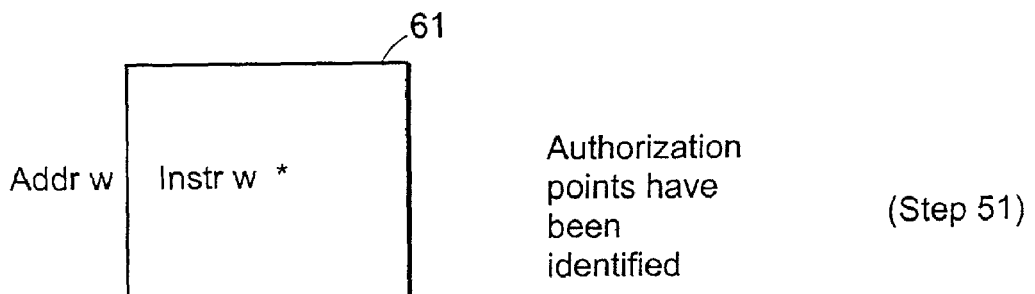
FIG. 7 is a schematic diagram illustrating the concepts of steps 51–55 of FIG. 6.
Figure 7:
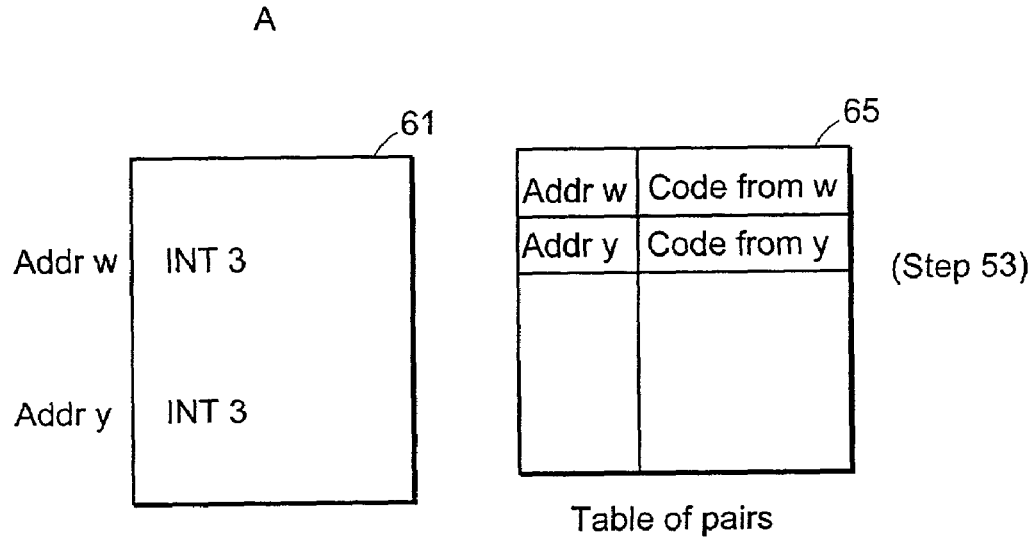
Figure 7:
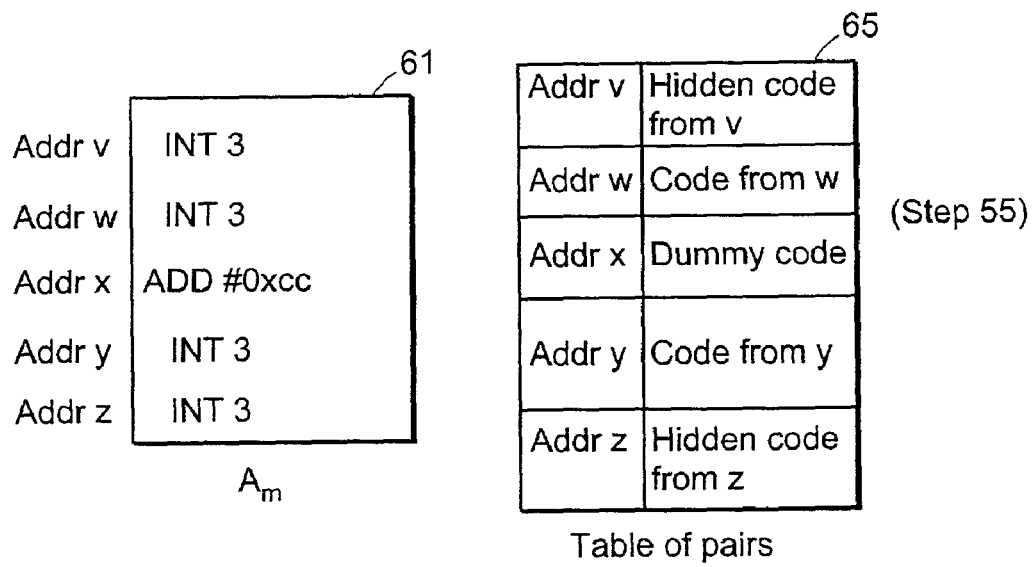

FIG. 7 is a schematic diagram illustrating the concepts of steps 51–55 of FIG. 6. In an exemplary application 61, two authorization points have been identified (FIG. 6, step 51) at addresses W and Y. The code at those two points is copied into a table 65, along with the code's associated address (W and Y in this example) and the original authorization points in application 61 are overwritten with transfer instructions (e.g., "INT 3") that will, upon execution, transfer control to a coupling agent 30 (step 53). Additional points that would transfer control to the identified authorization points are then identified (here at addresses V and Z) and are similarly overwritten, thus completely hiding (step 55) the authorization points. For reasons discussed below, the application 61 is now referred to as modified application $A_m$.

In addition, shown here at address X is an instruction that just happens to have in its immediate data the same value (0×CC) as the opcode for the transfer instruction used in the application code rewrite of step 53. To confuse the adversary, dummy code is added to the table of pairs 65 corresponding to the address of the 0×CC byte.

Referring back to FIG. 6, at step 57 an application-specific managed challenge system is constructed, in part from the coupling agent 30 (FIG. 5) and the table of pairs 65 (FIG. 7). Finally, at step 59, the managed challenge system and any related authorization or licensing libraries are linked into $A_m$.

When complete, the application-specific coupling agent 30 is able to generate, at run time, a code sequence for each authorization point.

Figure 8:
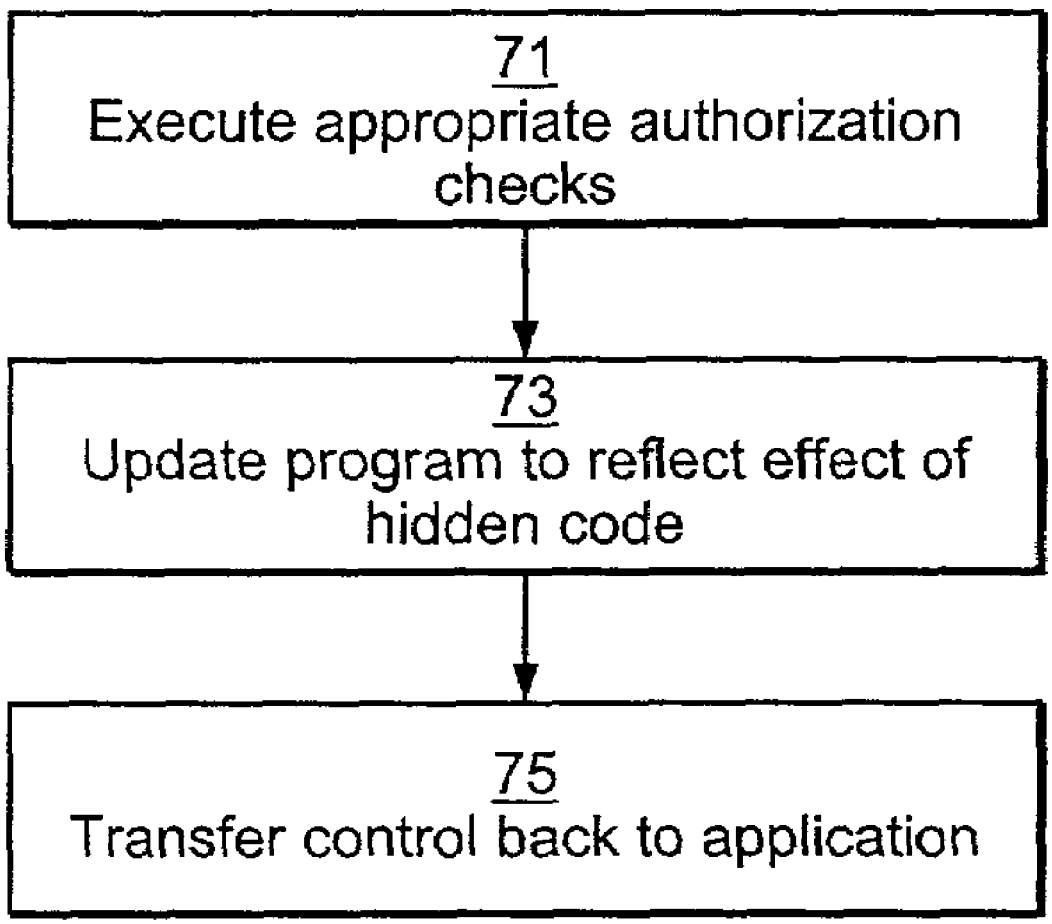
FIG. 8 is a flowchart illustrating the general operation of a code sequence generated by the application-specific managed challenge system constructed in FIG. 6.

FIG. 8 is a flowchart 70 illustrating the general operation of one such code sequence generated by the completed application-specific managed challenge system. For example, the code sequence executes the appropriate authorization checks (step 71), updates the program state to reflect the effect of the hidden application code (step 73), and then jumps back to the first instruction in $A_m$ that follows the hidden application code (step 75). The hidden application code includes, but is not limited to, the application bytes overwritten in the process of rewriting the subject application's code at the authorization point (and copied to a memory block). This example assumes that the authorization checks were successful.

Figure 9:
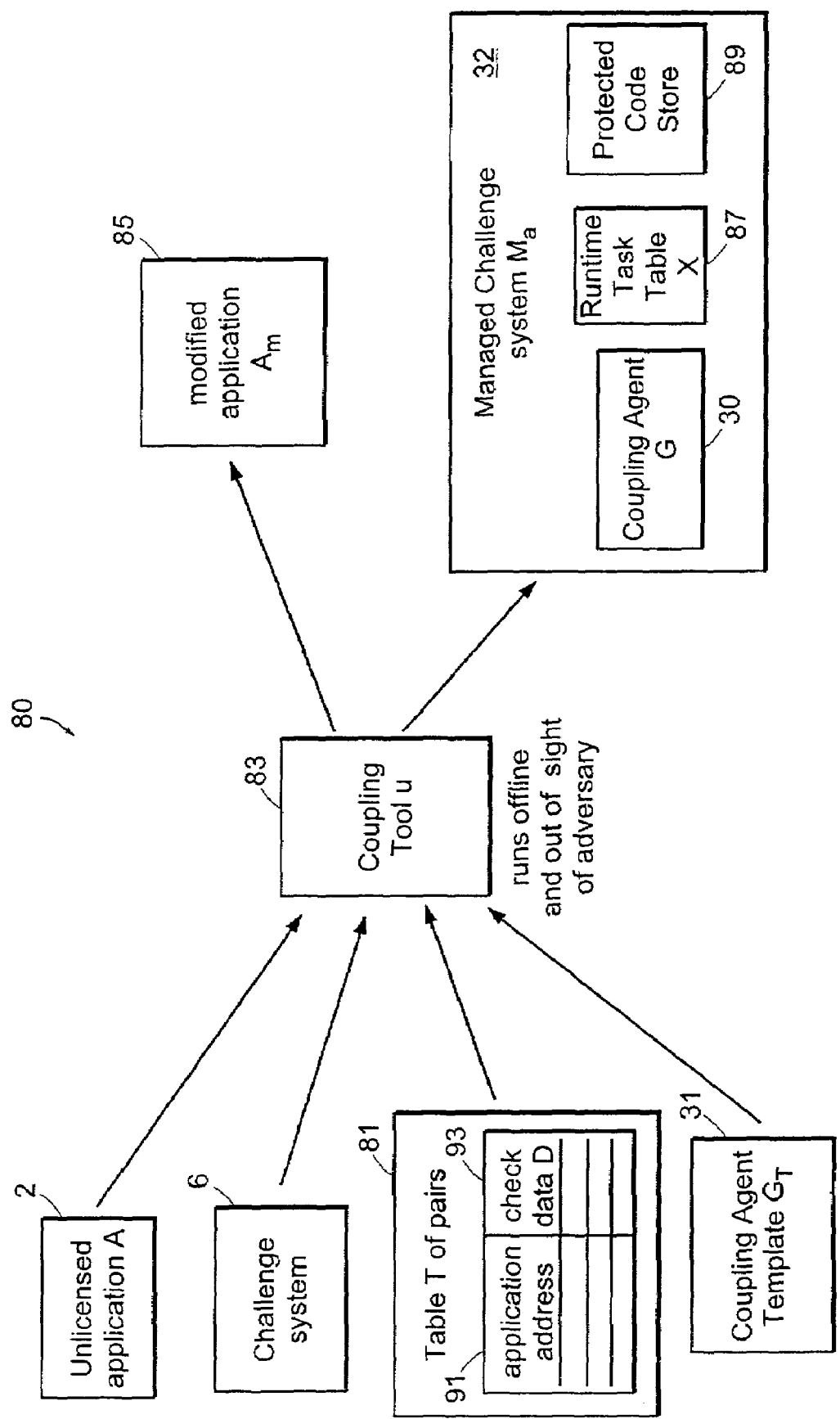
FIG. 9 is a block diagram illustrating the function of the off-line coupling tool (U) of an embodiment of the present invention, in producing a managed challenge system $M_a$.

FIG. 9 is a block diagram 80 illustrating the function of the off-line coupling tool (U) 83 of an embodiment of the present invention, in producing a managed challenge system $M_a$ 32. The coupling tool U 83 takes as input the application's executable (A) 2, a table (T) 81 of address 91/check data 93 pairs (described below), the challenge system (C) module code 6, and the code of a coupling agent template 31.

The check data D 93 describes the authorization work to be done at the associated authorization point in A. Check data may include, for example, the address of an authorization function in C 6 to be called, the actual parameters of that call for the associated authorization point, and/or the return values of that call that represent a successful authorization check.

From these inputs 2, 6, 81 and 31, coupling tool U 83 produces $M_a$ 32 and $A_m$ 85. Application $A_m$ 85 is a modified version of A 2 that requires $M_a$ 32 in order to run successfully. $M_a$ is a managed challenge system that is unique to $A_m$ and thus will not help an adversary trying to subvert another application protected by the present invention.

Managed challenge system $M_a$ 32 comprises a specialized coupling agent (G) 30, a runtime task table 87 specifying the runtime work for G 30 and indexed by unique identifiers associated with each point in $A_m$ that transfers control to $M_a$ (e.g., the address of the transfer point), and code in the protected code store 89. The protected code store 89 includes/represents the code taken from A 2, the code that composes C 6, and extra code that helps protect $M_a$ 32 (e.g., the hidden and dummy code sequences described below).

$M_a$ 32 represents the output of combining the coupling agent (G) 30, a challenge system (C) 6, authorization information, and pieces of the application (A) 2 to be protected into a module that can be statically or dynamically linked to $A_m$ 85. $M_a$ manages the runtime interaction between $A_m$ and an external authorization (or licensing) system. The coupling agent G 30 in this module performs the management function, described below.

Coupling agent G 30 is a run-time component of an embodiment of the present invention. It is responsible for catching the control transfers from the application ($A_m$) at the program points where authorization checks should occur. If code corresponding to an authorization point has not yet been generated, G 30 may dynamically generate and cache the required code. Ultimately, coupling agent G directs the program's control flow into the dynamically generated code required at an authorization point. The dynamically generated code returns control to $A_m$ 85 if the authorization check succeeds.

Coupling agent G 30 also handles the runtime work associated with the protection of the managed challenge system $M_a$ 32. This protection work includes, for example, the runtime aspects of the mechanisms used to hide the control transfers in $A_m$ 85 to $M_a$ 32 and to obscure the contents of the data structures used by coupling agent G 30 to produce the dynamically generated code at an authorization point.

Identifying Authorization Points (FIG. 6, Step 51)

The process begins by identifying "authorization points"—points in an unprotected application A 2 where an authorization check should occur. If authorization checks only need to be performed on some subset of the software modules that comprise the application 2, then these modules (e.g., dynamically linked libraries, or DLLs) must be identified, for example, by the application vendor.

An authorization point can be something as simple as the starting byte address of an instruction in A 2. A particular authorization check is associated with each authorization point. The check may be, for example, a simple call to a routine in response system R 8 (FIG. 5), with the result indicating the success of the check, or the check may be as complex as necessary. The information that defines the authorization check is referred to herein as "check data".

There are many ways to identify authorization points and associate check data with those points.

For example, at one end of the spectrum, a compiler may be modified to recognize special pragmas (e.g., flags, pragma statements, or other associations, etc.) used for code or data protection. A software developer can then attach a respective pragma to various source code lines of the application 2 to indicate respective points at which an authorization check should occur. Each pragma may additionally contain the check data for its authorization point. The compiler may then be responsible for producing the protected binary, as described below.

Figure 10:
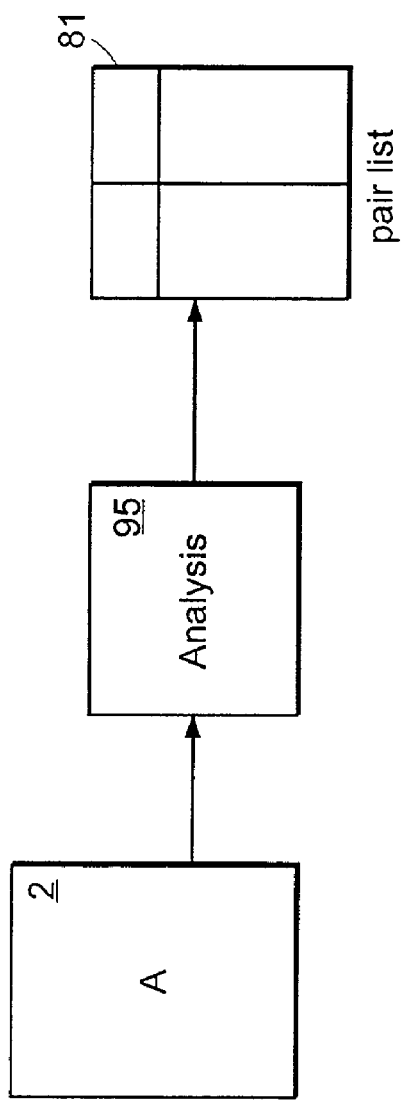
FIG. 10 is a block diagram illustrating analysis of an application program to produce a table or file of pairs for the present invention, where each pair contains an authorization point and the associated check data.

Alternatively, as illustrated in the block diagram of FIG. 10, a person at the application publisher (e.g., a security professional or even someone from the sales and marketing department) could, by analysis 95 of the application program 2, produce a table or file of pairs 81, where each pair contains an authorization point 91 (e.g., the starting byte address of an instruction in A 2) and the associated check data 93 (see FIG. 9). The coupling tool 83 of FIG. 9 may then be used to rewrite the application's 2 binary executable, using the contents of the pairs file 81 to drive the rewriting process and produce a licensed application.

Figure 11:
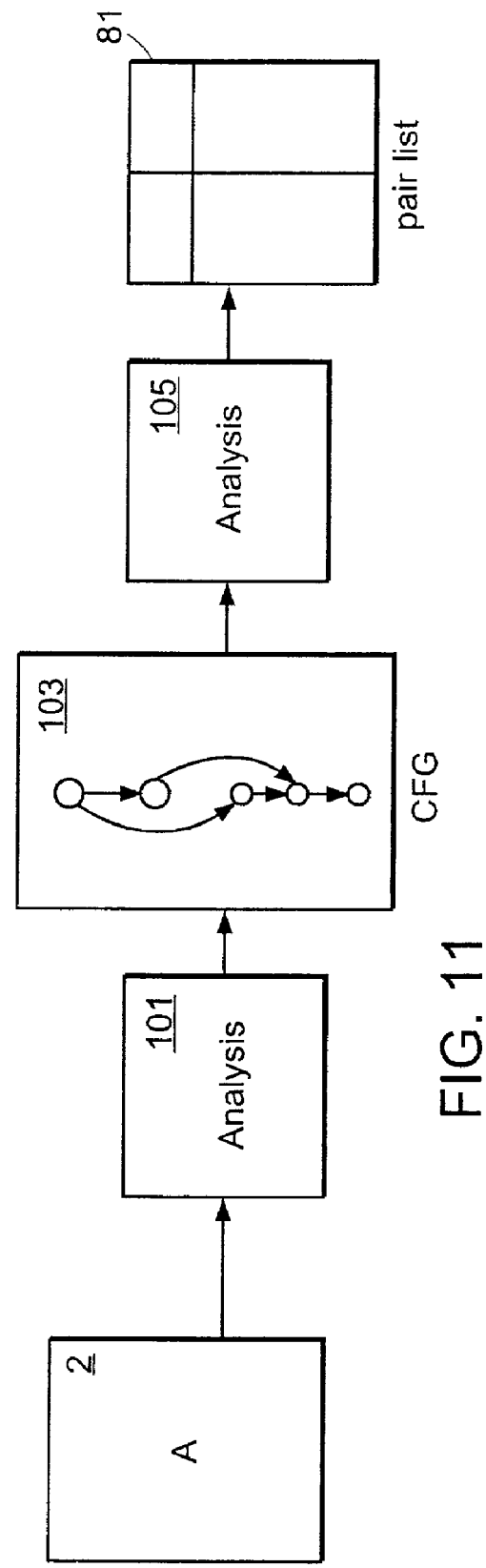
FIG. 11 is a block diagram illustrating alternatively how an unprotected application could be turned into a licensed application without any support from the developer of the application, according to an embodiment of the present invention.

In yet another alternative, illustrated in the block diagram of FIG. 11, an unprotected application 2 could be turned into a licensed application without any support from the developer of the application 2. In all executables, there are clearly identifiable points that can be used to find the starting address of an instruction, e.g. the starting address of the program, the starting address of an exported function, the information associated with a relocation entry, etc. From these points, it is relatively easy for one skilled in the art, using an analysis tool 101, to decode the instruction sequence beginning at those points and construct a control flow graph (CFG) 103 for the application 2. A security professional or other person responsible for protection of the application module could, by analysis 105 of the CFG 103, produce a table or file of pairs 81 identical in content to what was produced in FIG. 10.

A CFG is a grouping of the binary code into nodes, each node representing a sequence of straight-line code with the property that control can only enter each sequence at the first instruction in the sequence and leave only after executing all instructions in the sequence. CFG nodes are connected by directed edges that indicate that control can flow from the node at the tail of the edge to the node at head of the edge.

This approach may yield only a partially specified CFG if the application 2 contains program points that cannot be identified statically, e.g. a program point that is reached only through a jump instruction whose target address is determined at runtime. However, a fully specified CFG is not required for the invention to work. That is, a partially specified CFG may be sufficient because a limited number of randomly-specified, valid instruction points in the known CFG may be sufficient for license enforcement.

If desired, coverage of A's CFG 103 can be increased by augmenting the information learned from static analysis with information learned by tracing A's 2 execution under a number of different input data sets (not shown). Through tracing, it can be determined how control reaches and proceeds through the parts of A 2 that were previously not able to be analyzed using static analysis. There exist numerous methods well known to those in the industry for tracing program execution.

For example, tracing techniques based on special hardware resources that, for example, interrupt the program execution on every taken branch, could be used directly. For architectures without special hardware support for tracing, the execution of the application could be emulated to create a detailed execution trace.

Code Rewriting for Control Transfer from A 2 to the Coupling Agent 30 (FIG. 6, step 53)

Given the address of the first byte of an instruction at an authorization point in A 2, the coupling tool 83 (FIG. 9) of an embodiment of the present invention replaces the byte, and possibly the other bytes in the instruction, with one or more new bytes that when executed cause the program control to be transferred to the managed challenge system $M_a$ 32.

Note that the mechanism that causes the transfer appears in the application code and replaces some subset of the original bytes in the application 2. If not, it would be possible to separate A 2 from $M_a$ 32, leaving a fully functional version of A 2. It is also important that each transfer either includes some unique identifier or targets some unique location in $M_a$ 32, so that $M_a$ 32 can determine which authorization point was encountered and thus what authorization work needs to be performed.

For ease of discussion, assume that the inserted byte sequence is a single instruction and that this new instruction completely replaces the original instruction at the authorization point. Though this is likely to be the case for instruction sets with fixed-length instructions, the possibilities for architectures with variable-length instructions are much richer. Though variable-length instruction sets provide the ability, for example, to replace a single original instruction with several shorter, new instructions, the goal and basic approach of the present invention remain the same.

One possible solution is to replace the original instruction with an instruction that causes a runtime fault. For example, the coupling tool 83 may modify A 2 so that $M_a$ 32 is always installed as the first handler for the exception caused by the faulting instruction. The handler in $M_a$ 32 may use the fault address as the unique identifier for the authorization point and store the check data for each valid authorization point in a data structure such as a hash table indexed by the fault address. If the fault address is not a valid authorization point, $M_a$ 32 may pass the fault on to the next exception handler in the chain of exception handlers.

It is always possible to ensure that $M_a$ 32 is the first handler for any runtime exception, since this is the same procedure used for debugging an application. When debugging an application, the debugger is always the first to catch a runtime exception, enabling the user of the debugger to inspect the exception and optionally resume the application without delivering the exception to the application code. In this case, $M_a$ 32 inspects the exception and decides whether or not to deliver the exception to the application code or to resume normal execution of the application 2.

Alternatively, the original instruction may be replaced with a call into $M_a$ 32. In this approach, the return address may serve as the unique identifier and all calls may target a single point in $M_a$ 32, or each call may directly target a unique code sequence.

In either case, the insertion of control transfers can be accomplished without access to the source code of A 2. Care must be taken to insert new instructions that do not destroy program state required by later instructions in A 2. This aspect of the problem and appropriate solutions are well known to those familiar with the basics of binary rewriting.

Hiding the Control Transfers from $A_m$ 85 to $M_a$ 32 from Static Analysis (FIG. 6, Step 55)

A key attribute of effective license enforcement is the use of information that is unknown to the adversary and difficult to reconstruct. As such, it is vital in all approaches that the authorization points selected (and input data sets used for the tracing strategy described above) are kept secret.

One approach to hiding the inserted instructions that transfer control from $A_m$ 85 to $M_a$ 32 at each authorization point is based on the fact that the binary rewriting process can make it impossible for the adversary to construct a complete CFG for A 2. As discussed above, a CFG 103 (FIG. 11) can be constructed for A 2. If this CFG were constructed after choosing the authorization points, then an adversary could use this CFG to identify authorization points that are directly observable from static analysis.

Thus, for each observable authorization point, a set of control transfer instructions is selected whose removal would make it impossible to find that authorization point via the static analysis described above, using a CFG 103 constructed from A 2. Many methods exist for choosing such a set, the simplest being one that removes control transfer instructions from the CFG 103 until it is not possible to reach the authorization point via a path in the modified CFG.

Figure 12:
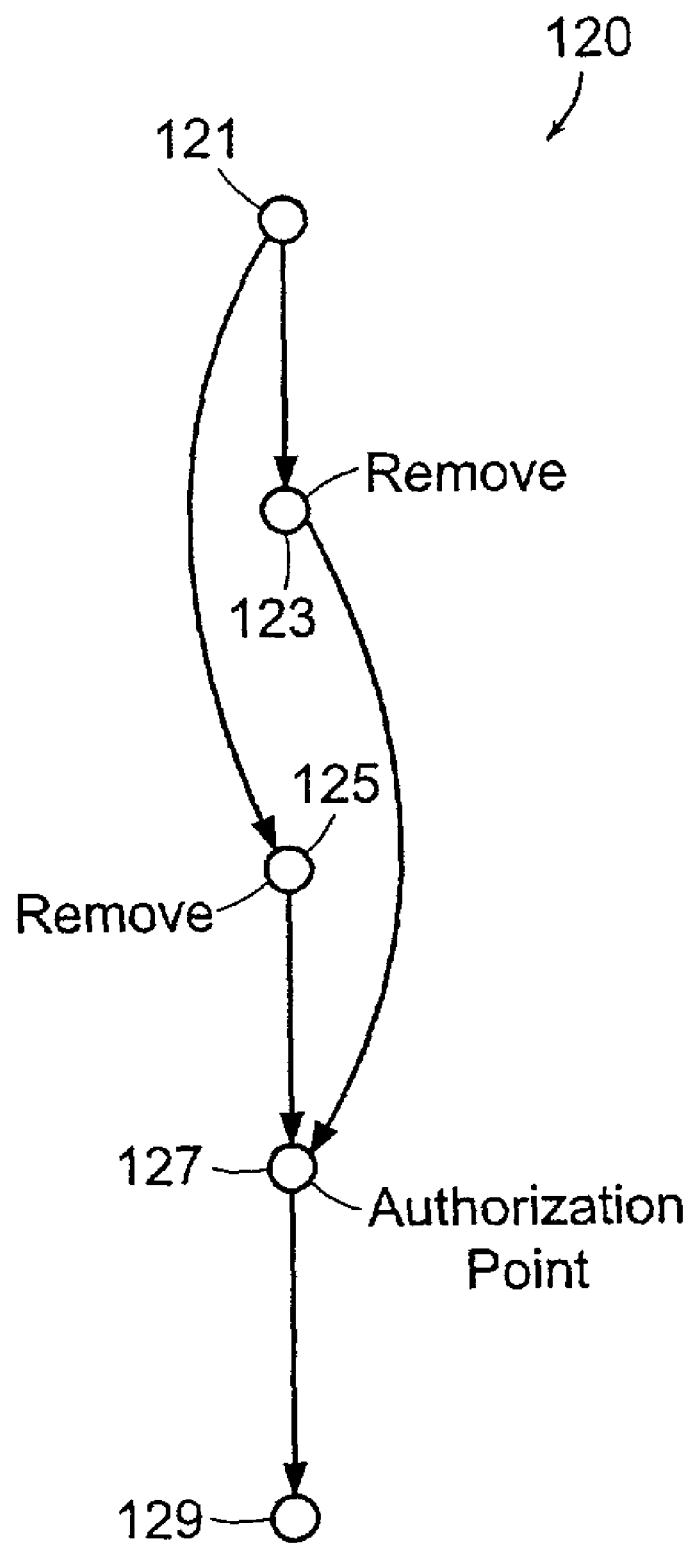
FIG. 12 is a simple control flow graph, used to illustrate the concept of removing code at nodes which transfers control to an authorization point in order to completely hide the authorization point from static analysis, as done by an embodiment of the present invention.

For example, FIG. 12 illustrates an exemplary, albeit somewhat simple, control flow graph 120, containing five nodes 121, 123, 125, 127 and 129. Node 127 represents an authorization point. By removing the code in each of nodes 123 and 125 which transfers control to node 127, and moving that code into $M_a$ 32, authorization point 127 is completely hidden from this static analysis.

More sophisticated methods could use additional information, based on further static analysis or profile data, to choose a set of control transfer instructions (effective for hiding authorization/control transfer points) that minimizes the overhead of the protection scheme on the runtime of the licensed application.

For example, node 125 in FIG. 12 may comprise a loop that executes frequently. To reduce runtime overhead, nodes 121 and 123 may be removed instead of 123 and 125, assuming node 121 executes less frequently than 125. Both choices accomplish the goal of making it impossible to reach node 127.

Once a pertinent set of control transfer instructions has been identified for removal, the same rewriting method described above may be used to transform each control transfer instruction in this set into a control transfer to $M_a$ 32, the only difference being that no authorization check is performed by $M_a$ 32 for these points.

Clearly, it should not be possible to follow the control flow statically in $M_a$ 32 to discover the targets of the removed control transfer instruction. This requirement is easily satisfied by any of the solutions described below, with respect to step 57 of FIG. 6.

Though an adversary may be able to identify some authorization points at runtime, these are limited to just those authorization points that are uncovered by the particular program run. For an adversary to be sure that all of the authorization points in a protected application have been uncovered, the adversary must find a set of data inputs that provides 100% code coverage.

Code coverage analysis and coverage testing is the problem of determining a set of inputs that exercise every instruction in an application module. A typical application module consists of a number of decision points that determine the control flow through its program code as it executes. Modern applications have many thousands of decision points, making the decision tree very large and complex.

To achieve 100% code coverage, a set of inputs must exercise every limb of the decision tree. This is known to be a mathematically exponential process, placing the problem into a category known as "NP-hard". NP-hard problems have no known efficient solution. For the code coverage problem described here, a methodical solution based on enumeration would take an exponentially long time, given the complexity of the decision tree in most modern applications. Thus, it is impractical for an adversary to try to identify all authorization points by solving the code coverage problem.

Given one run of a licensed application module $A_m$ 85 with a valid license, an adversary could potentially learn the byte sequence used to transfer control from $A_m$ 85 to $M_a$ 32 at the executed authorization points. Though it is possible to use different byte sequences for the different authorization points, even if just a single sequence is used for transfer of control at all authorization points in A 2, it can be argued that, even if the adversary learns this single sequence, the protection scheme of the present invention cannot be subverted.

For ease of discussion, assume that A 2 has been compiled to run on an Intel x86 microprocessor and that the single byte "INT 3" debugger trap instruction, having an opcode of $CC_{16}$ (0xCC), is used as the trapping sequence. Scanning a licensed binary and searching for all occurrences of $CC_{16}$ will produce a candidate set of locations strictly greater than the set of all authorization points in the application 2. Recall that, given the work described above to obscure A's 2 control flow, static analysis of A's binary for purposes of producing a CFG will not help the adversary to reduce the candidate set.

Assume now that the adversary can trace the execution of the coupling agent G 30 in $M_a$ 32 and learn how it verifies the address of a valid authorization point. One possible attack then would be to mimic this verification process for each occurrence of $CC_{16}$ in the candidate set and thus reduce the candidate set down to exactly the set of authorization points. An embodiment of the present invention thwarts such attacks by creating a dummy entry in $M_a$'s runtime task table 87 and protected code store 89 (FIG. 9) for each member of the candidate set.

This can be done safely for each $CC_{16}$ that is not a valid authorization point or a valid trap instruction used in A 2, because a $CC_{16}$ byte can only cause an exception during program execution if it is interpreted by the execution hardware as a $CC_{16}$ instruction. If a particular $CC_{16}$ byte cannot cause an exception at runtime, a dummy entry may be entered into the runtime task table 87 and bogus code stored in the protected code storage 89 (FIG. 9) for this byte. On the other hand, the dummy entry and bogus code will confuse the adversary, and if he or she tries to replace said $CC_{16}$ byte with the bogus code, an incorrect version of A 2 will result.

One must, however, be concerned with valid $CC_{16}$ instructions placed in A 2 by the application module developer. Several possible solutions exist. For example, at one extreme, the application developer can, when inserting the authorization points, indicate which of the existing $CC_{16}$ bytes are valid instructions. The coupling tool 83 could then use this information to disable the creation of dummy entries in the runtime task table 87 for those bytes.

On the other hand, where a protected application 85 is being created without assistance from the application module developer, the present invention must be limited to those $CC_{16}$ bytes that can be identified as part of other valid instructions in the partially specified CFG. Here, the same approach described above to obscure the authorization points from the adversary can be employed. Once control transfer instructions have been removed to obscure the authorization points, it is very difficult for the adversary to reconstruct the hidden information, and the adversary is again left with the unsolvable problem of trying to identify which $CC_{16}$ bytes in the candidate set correspond to valid authorization points.

Constructing an Application-Specific Managed Challenge System $M_a$ 32 (FIG. 6, step 57)

At each authorization point, $M_a$ 32 must be able to map the unique identifier of that point to its associated hidden application 2 code and authorization check data 93. Once the work to be done for the authorization point has been identified, $M_a$ 32 must execute a sequence of instructions that accomplishes that work.

If the authorization check fails, $M_a$ 32 may abort the program execution in a manner consistent with the protecting vendor's specifications. If the authorization check succeeds, $M_a$ 32 may return control to the application module 85 with a valid program state that includes the work done by the hidden application 2 code.

First described are the actions required to transform the program state at the authorization point to what the program state should be when control returns to the application 85 from the authorization check. The resulting program state should reflect the effect of the hidden application 2 code and the skipped application code, if any, between the authorization point and the point where control returns from $M_a$ 32.

The problem of successfully transforming a program's state and continuing its execution is equivalent to the problem of producing compensation code along program paths that contain instructions whose execution was the result of an incorrect speculation. Well-known, compile-time algorithms exist for solving such problems (e.g. Trace Scheduling as described by Lowney, et al., "The Multiflow Trace Scheduling Compiler," The Journal of Supercomputing, Vol. 7, No. 1–2, pp. 51–142, 1993, citeseer.nj.nec.com/lowney92multiflow.html) that can be adapted to produce an algorithm to adjust the program state.

Figure 13:
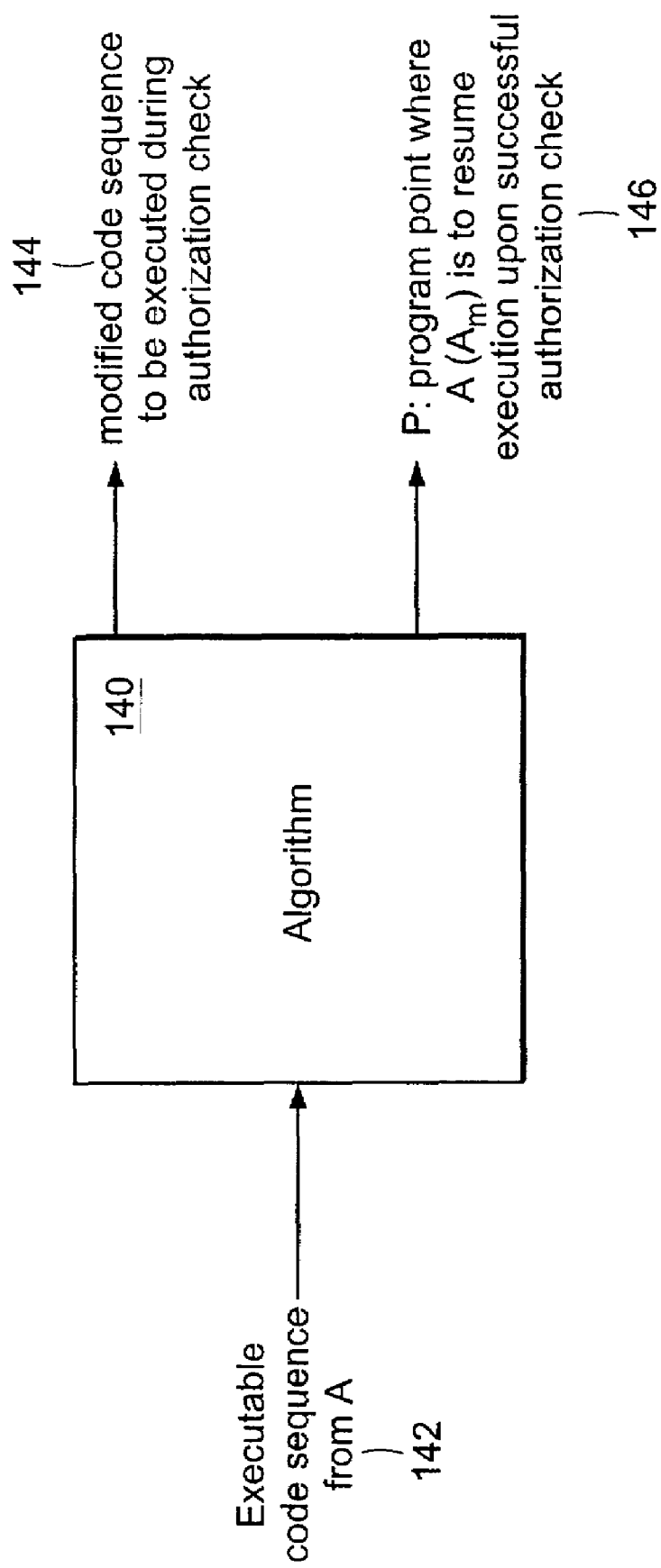
FIG. 13 is a block diagram of an algorithm, used by an embodiment of the present invention, which takes as input an executable code sequence before insertion of a control transfer and which produces as output a modified instruction sequence and program point corresponding to the point where the protected application's execution is resumed.

FIG. 13 is a block diagram of such an algorithm 140, which may take as input the executable code sequence 142 before insertion of the control transfer to $M_a$ 32, and produces as output a modified instruction sequence 144 and program point P 146. The modified instruction sequence 144 is the instruction sequence to be executed by $M_a$ 32 during the authorization check, and P 146 corresponds to the program point where $M_a$ 32 resumes the protected application's ($A_m$) 85 execution.

Next, given an authorization point, the check data 93 for said point, an instruction sequence to be executed by $M_a$ 32 on behalf of A 85 at said point, and an instruction sequence corresponding to the work specified by said check data 93, a single instruction sequence may be constructed that performs the required work.

In one embodiment, instructions from the two input instruction sequences are interspersed to form a single instruction sequence, referred to as the "merged code sequence". Methods available for creating a merged code sequence are well known to those familiar with binary rewriting for the purposes of code instrumentation, since instrumentation of a binary requires one to merge new code sequences into existing code sequences.

For the program points in A 2 where the code was rewritten to hide authorization points, an appropriate instruction sequence must also be created to be executed by the coupling agent 30 on behalf of A 2 at that point. For these points, the resulting instruction sequence is referred to as the "hidden code sequence", since there is no authorization work (and thus no merging work) to be performed.

For the program points in A 2 that were identified as dummy authorization points (i.e., program points whose pre-existing byte sequence matches that used for a true authorization point), a merged code sequence is created that appears genuine. To minimize confusion, these fabricated code sequences built for dummy authorization points are referred to as "dummy code sequences".

Once a merged code sequence has been created for every authorization point, a hidden code sequence for every rewritten control transfer instruction, and a dummy code sequence for every dummy authorization point, code for the coupling agent 30 of $M_a$ 32 may be generated. The particular manner in which the coupling agent 30 is constructed depends upon the method chosen to protect the channel 28 (FIG. 5) between the coupling agent and response system R 8. In fact, a wide variety of techniques are available since the use of any particular technique does not impact the development or engineering of A 2. Very sophisticated techniques may be chosen to protect this channel 28, because the effort involved in such an undertaking needs to be done only once, during the implementation of the tool that creates the coupling agent 30 for an application 2. The effort may be amortized over every application 2 module that uses said invention for protection.

One option for building the coupling agent 30 is to create it simply as a conglomeration of all of the merged, hidden, and dummy code sequences. Depending upon the exact method chosen for implementing the control transfer at the program points where code in A was rewritten, the constructed coupling agent 30 may contain additional code for dispatching from a central point to each code sequence, as explained above.

To thwart any attempt at separating the work done on behalf of A 2 from the work done for authorization, code obfuscation techniques may be applied to the entire conglomeration of code forming the coupling agent 30. Published literature contains descriptions of various methods for achieving effective code obfuscation using automated techniques. (See, for example, the Collberg paper referenced above.) Unfortunately, these methods often incur a heavy runtime penalty, and thus their use may be limited to code sequences in the coupling agent that are infrequently executed if there is concern, as there well might be, with the overhead of the protection scheme.

Figure 14:
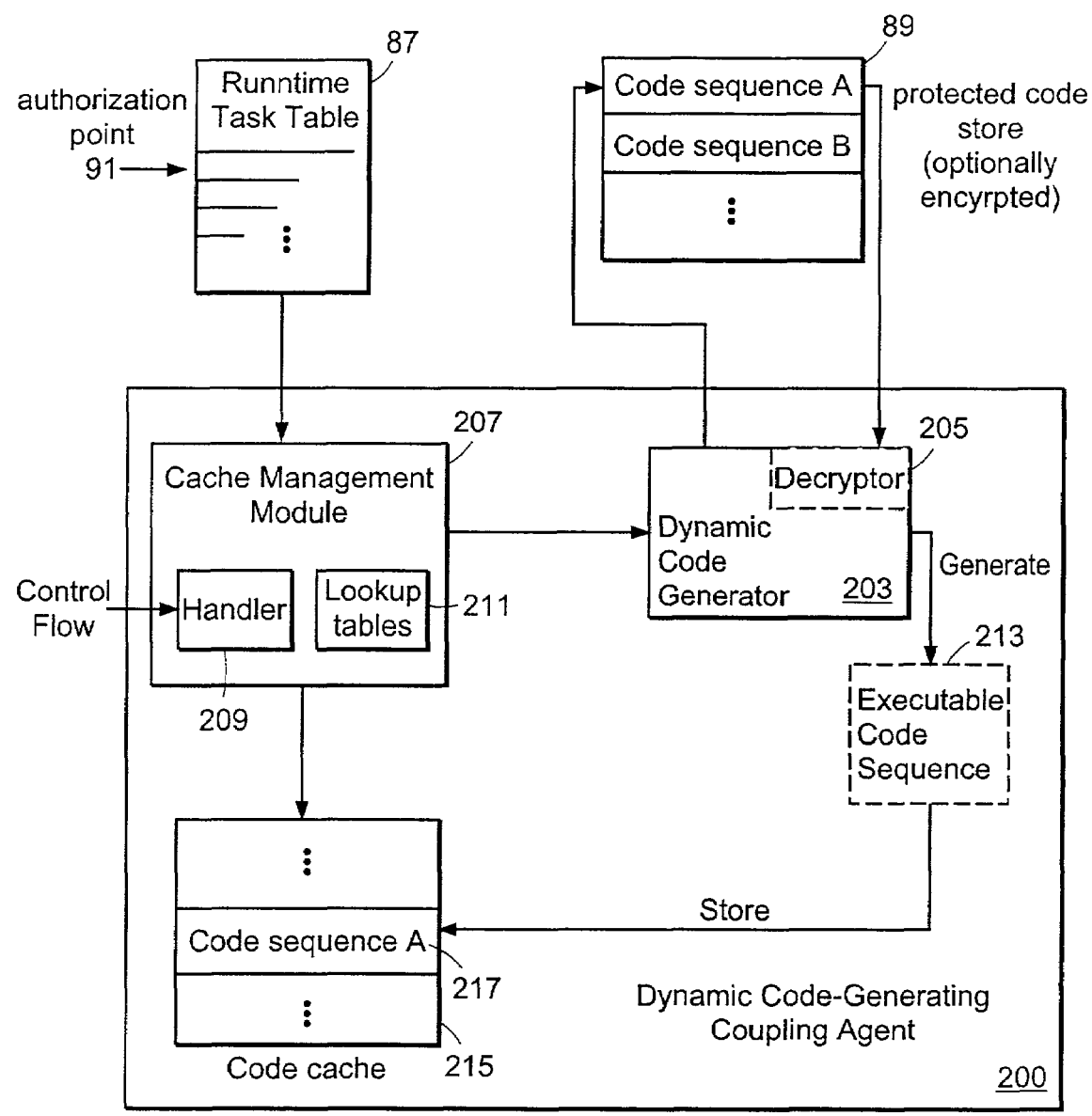
FIG. 14 is a schematic diagram of an embodiment of the present invention, illustrating the coupling agent as a dynamic code generator, including code for dynamic code generation, a code cache, and a cache management module.

Another option, as illustrated in FIG. 14, is to build the coupling agent 200 as a dynamic code generator, in which case the coupling agent 200 may comprise code for dynamic code generation 203, a code cache 215 with entries 217 holding the generated code sequences 213, and a cache management module 207.

The dynamic code-generating coupling agent 200 interacts with the runtime task table 87 and the protected code store 89. The store 89 may be protected by a wide variety of methods; a protection method is effective if it makes it difficult for an adversary to (a) understand the contents of the store without executing the program and/or (b) change the contents of the protected store. Recall that the protected code store 89 may contain merged, hidden, and dummy code sequences. As previously discussed, dummy entries in the code store 89 make it difficult for the adversary to determine which entries in the store contain valid code, and thus know what code in the store should replace the byte sequences in the licensed application 85 that may represent control transfers to the coupling agent 200.

In a further embodiment, the contents of the store 89 may be encrypted before distribution with the private half of an asymmetric key pair. This approach achieves one of the effectiveness criteria, since an adversary can effectively change the contents of the table only if he or she can discover this private key. This removes the potential attack involving a masking out of the authorization checks from all entries (dummy or real) in the protected store 89.

Figure 15:
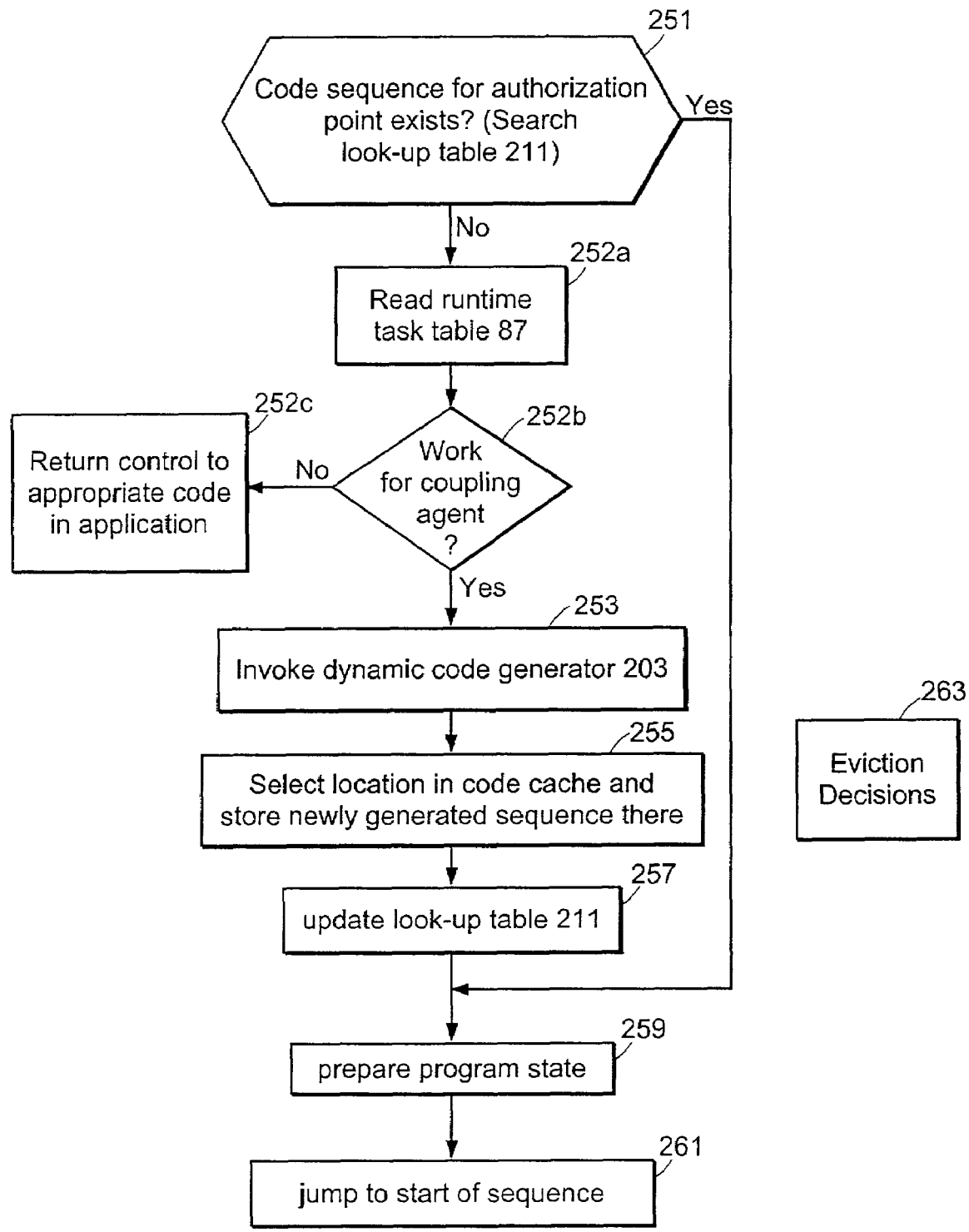
FIG. 15 is a flowchart illustrating some of the responsibilities of the cache management module of FIG. 14.

The cache management module 207 may be the main driver of the coupling agent 200 as a dynamic code generator. FIG. 15 is a flowchart illustrating some of the responsibilities of the cache management module 207 of FIG. 14. This flowchart will help explain the rest of elements of FIG. 14 and their interconnections.

The handler 209 of the cache management module 207 is invoked when control first enters the coupling agent 200. The module 207 first checks, at step 251, whether the code sequence for a particular authorization point (or rewritten control transfer instruction) has already been generated and written to the code cache 215. The code cache 215 is simply a block of memory 217 used to store the generated code sequences 213, as described below.

If the required code sequence exists, an entry for it will exist in the look-up table 211, and this entry will specify where to find the required code sequence in the code cache 215. If found, the cache management module prepares the program state for jumping into the identified code sequence 217 in the code cache (step 259) and then jumps to the start of that code sequence (step 261). Recall that the code sequences are created to jump directly back to the correct continuation point in the licensed application 85.

Program state preparation (step 259) is required, for example, in the case where control reaches the coupling agent via an exception, for example, through an interrupt instruction. For an interrupt instruction, the program state that should be in the hardware registers currently resides in the exception frame. The coupling agent 200 is responsible for performing all such restoration actions, specifics of which depend upon the method of control transfer selected for reaching the coupling agent at an authorization point.

If the cache management module 207 finds, as a result of step 251, that the code cache 215 does not contain the necessary code sequence 213, then the runtime task table 87 (step 252a) is read using an index based on the authorization point 91 (or unique identifier associated with the control transfer into the coupling agent 200). In step 252b, the cache management module 207 uses the data returned from the runtime task table 87 to decide whether control should be returned to the licensed application 85 (step 252c) or whether it should invoke the dynamic code generator to create the sequence (step 253).

In the latter case, the dynamic code generator 203 uses the information from the runtime task table 87 to read an entry in the protected code store 89 and create an executable code sequence 213. The complexity of the dynamic code generator 203 depends upon the methods used to protect the contents of the store 89. If one believes that a merged code sequence is actually quite difficult to understand and safely change, then the dynamic code generator 203 can effectively be a routine that implements block copy. Alternatively, if the entries in the store are encrypted, then the dynamic code generator 203 must also include a decryption function 205.

The cache management module 207 then selects a location in the code cache 215 at which to place the newly generated sequence 213 (step 255), updates its lookup tables 211 (step 257) so that it will recognize that later requests for this code sequence 213 simply need to jump into the code cache 215, prepares the program state (step 259), and finally jumps into the instruction sequence in the code cache (step 261).

As with all hardware and software cache structures, the cache management module 207 is also responsible for choosing which stored code sequences 217 to evict from the cache 215 when no free location for a newly generated code sequence exists (shown as step 263). In particular, the code cache can be purposely sized such that it is not large enough to contain all of the dynamically created code sequences, with the beneficial result that any single run of the application cannot produce the entire original application bits in memory.

The invention does not preclude the use of any particular cache structure. Clearly, the decision to use one kind of cache structure (e.g., direct mapped vs. set associative) will affect the final implementation of the cache management module 207, but such a decision is not key to the effectiveness of the present invention.

There are many advantages to the dynamic code generation approach. For example, runtime code generation of the authorization checks removes the most common and popular attack employed by those looking to pirate a protected application: rewriting of the application's binary to remove calls to an authorization check or to use the results of such calls. An adversary must instead perform these attacks at runtime, and this significantly increases the difficulty of the task facing the adversary. Furthermore, even if the adversary can identify the location where such an authorization call exists in one execution, the normal functioning of the code cache 215 of an embodiment of the present invention can have this same call appear at a different address in memory during the next execution of the protected application.

Caching of the dynamically generated code also yields performance benefits because work done by the dynamic code generator 203 (e.g., decryption of entries in the protected code store 89) may be reused many times before being discarded. In addition, the dynamically generated code can be very efficient because protection of these sequences 213 from manipulation and analysis by the adversary is provided by the dynamic code generation process (e.g., encryption of the protected code store 89 in FIG. 14) and not by obfuscation of the executed code sequence.

Finally, the coupling agent 200 may include additional capabilities for the sole purpose of reducing the overhead of the protection scheme. In particular, the coupling agent 200 may continually track the overhead of the dynamic code generation process and use this information to decide whether the dynamically-generated executable code sequence should be stored in the code cache or should directly replace the associated control transfer in the licensed application.

Direct replacement may involve removal of the authorization check and a reverting of the executable code sequence back to what it was before the code was removed from the application in step 53 of FIG. 6. Such direct replacement removes all overhead associated with the present invention for that protection point for the rest of the licensed application's current execution. Since no changes are made to the image of the application on disk, protection will again occur at that point on the next execution of the licensed application.

Linking the Managed Challenge System 32 into $A_m$ 85 (FIG. 6, Step 59)

Once the managed challenge system 32 has been created, it must be linked with the result of the binary rewriting of A 2, i.e., $A_m$ 85. While there are various options, three in particular that cover several different situations are now described.

One embodiment of the present invention may be incorporated into a compiler, which may then create a DLL that is linked with the final executable. This approach can be used to create a licensed application 85 or to produce a trusted software application that processes protected (e.g., encrypted) content directly.

In another embodiment, where an unprotected executable for A 2 is being rewritten without access to the source code or the normal development tool chain, the work to be done is generally identical to the work that is done when instrumenting an executable. The result of the instrumentation process is a new executable or application module that is distributed in place of the original, unprotected application 2. Again, the goal may be to produce either a licensed application 85 or a trusted processor for protected content.

The last example involves an interesting and increasingly common case. Suppose that a vendor owns some valuable content and wishes to distribute this content in a protected manner (e.g., in an encrypted form) so that only authorized users have access to the content. Suppose also that the clear text form of this content can be processed by many existing applications in the field, but the vendor does not own or control any of these applications. Music vendors, the MP3 file format, and the large number of available MP3 players are one example of such a market. Consumers of digital music do not want to install and run multiple different MP3 players simply because each music vendor desires their own protection scheme for their music content.

As another example, consider an enterprise that wishes to share the design of a proprietary machine part with a supplier. The enterprise may want to secure the computer-aided design (CAD) file so its access is restricted to authorized persons only. Such a security precaution would be commercially impractical if it required the supplier to install and run a specially-designed CAD package for each of its enterprise customers.

A U.S. patent application Ser. No. 10/194,655, filed on Jul. 11, 2002 by Bala and Smith, entitled "METHOD FOR PROTECTING DIGITAL CONTENT FROM UNAUTHORIZED USE BY AUTOMATICALLY AND DYNAMICALLY INTEGRATING A CONTENT-PROTECTION AGENT", (hereafter referred to as "the previous Bala and Smith patent application") and incorporated by reference herein in its entirety, describes an integration agent that automatically and dynamically (i.e., at run time) integrates a content publisher's content protection module with an existing content processor application on an end-user's machine. The content protection module is the content publisher's software implementation of, for example, the decryption scheme that converts a buffer of encrypted cipher text from the protected content file into clear text on demand, as the content processor application performs accesses to the protected content file. The content processor application is the software application (such as AUTOCAD, REALNETWORK REALPLAYER, or MICROSOFT WORD) used by the content consumer to view, play, or modify the content. This enables the content publishers to use their own custom encryption format to ship the content in a secure form, and yet have the authorized content consumer be able to process the encrypted content directly using his or her own, existing content processor application.

In this case, it is the content protection module, and not the content processor application, that is to be protected from subversion. This works well because the content publisher is in control of the content protection module but not the content processor application. Furthermore, using the invention in the referenced patent application to protect against the execution of the content protection module without proper authorization is a critical step in addressing the runtime security goals for such a content protection scheme.

Figure 16:
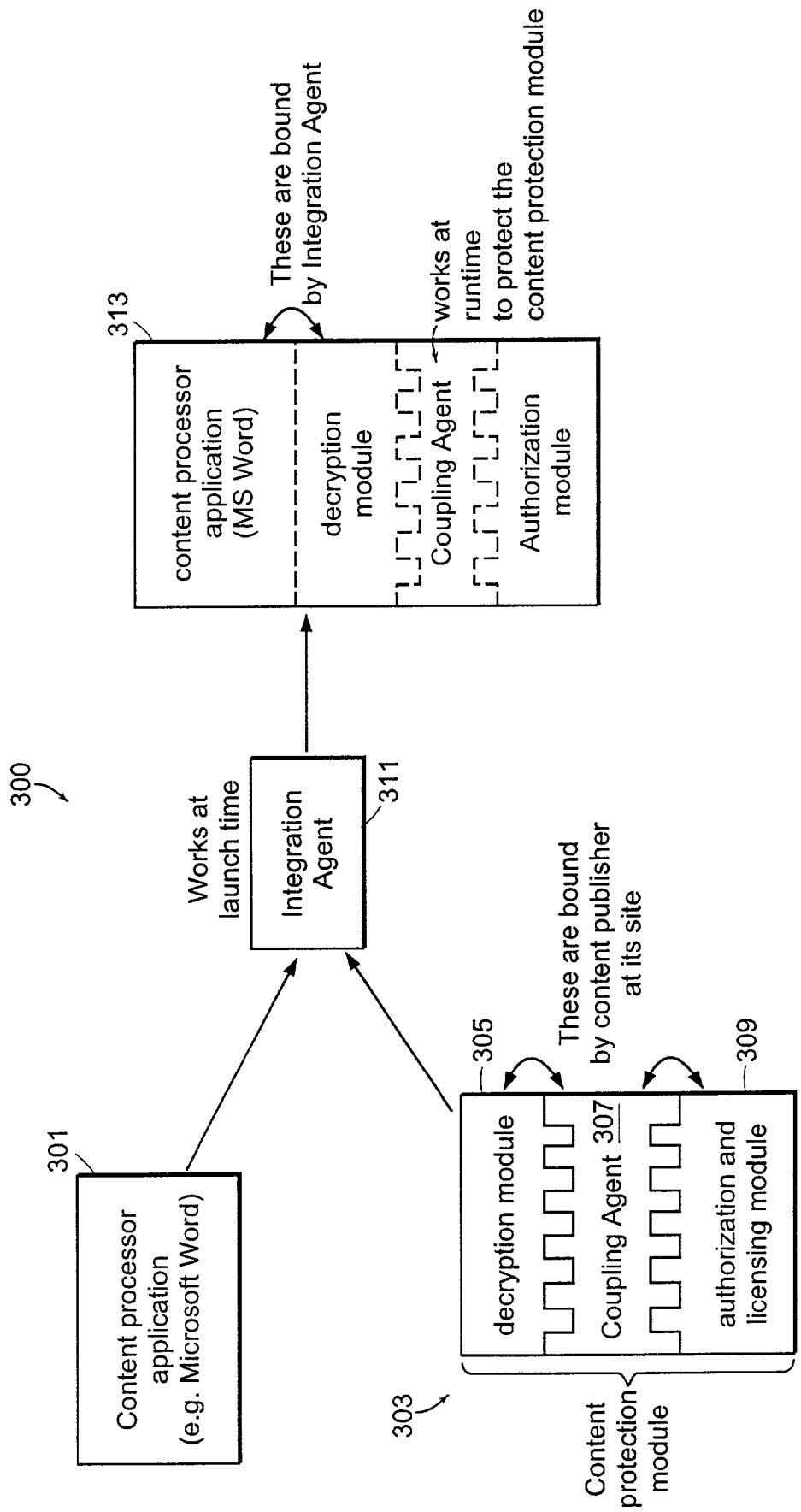
FIG. 16 is a block diagram illustrating how an embodiment of the present invention may be used for protecting content using an existing content processor application.

FIG. 16 is a block diagram illustrating how an embodiment of the present invention may be used, in conjunction with the invention described in the previous Bala and Smith patent application, for protecting content using an existing content processor application 301. A content publisher creates a custom decryption module 305 and couples it with a third-party library 309 for licensing using a coupling agent 307 of an embodiment of the present invention to create a licensed content protection module 303. The content publisher then uses the integration agent 311 described in the previous Bala and Smith patent application to automatically and dynamically integrate the licensed content protection module 303 with any existing content processor application 301.

The resulting custom content processor application 313 is able to transparently manipulate the protected content and yet is protected against unauthorized use and attempts to subvert the authorization checks. Together, this combination enables a content publisher to distribute protected content files in a secure and commercially practical manner.

One benefit of the present invention is that the coupling agent (and the rest of the license verification system or managed challenge system) can be upgraded as new license subversion attacks become known, without requiring updates or changes to the licensed application. In addition, because the present invention does not necessarily depend upon cryptographic techniques, it may not be subject to export restrictions associated with cryptographic technology. This makes it a practical choice for software vendors whose products are distributed in global markets.

Those of ordinary skill in the art should recognize that methods involved in protecting software applications against static and dynamic software piracy techniques may be embodied in a computer program product that includes a computer usable medium. For example, such a computer usable medium can include a readable memory device, such as a solid state memory device, a hard drive device, a CD-ROM, a DVD-ROM, or a computer diskette, having stored computer-readable program code segments. The computer readable medium can also include a communications or transmission medium, such as a bus or a communications link, either optical, wired, or wireless, carrying program code segments as digital or analog data signals.

While the system has been particularly shown and described with references to particular embodiments, it will be understood by those of ordinary skill in the art that various changes in form and details may be made without departing from the scope of the invention as encompassed by the appended claims. For example, the methods of the invention can be applied to various environments, and are not limited to the described environment.

What is claimed is:

1. A method for protecting a software application module, comprising:
   given an application module having executable code, constructing a managed challenge system specific to the application module, said constructing including copying certain executable code from the application module and forming the managed challenge system, the certain executable code being at identified authorization points in the application module;
   rewriting the application module by overwriting the certain executable code at identified authorization points with control transfers to the managed challenge system, such that a rewritten application module results;
   for a byte sequence in the application module which matches one of said control transfers and which does not correspond with an identified authorization point, including dummy code in the managed challenge system;
   associating said dummy code with said byte sequence; and
   linking the managed challenge system to the rewritten application module wherein the steps of rewriting, constructing and linking are able to be performed by a compiler, the compiler creating a shared object that includes the managed challenge system and that is linked with the rewritten application module; and
   wherein the step of rewriting further comprises, without access to source code, instrumenting the application module's executable code.

2. The method of claim 1, further comprising:
   identifying the authorization points in the software application module.

3. The method of claim 2, wherein identifying authorization points comprises:
   determining special pragmas used for code/data protection and associated with source code of the application module at the authorization points.

4. The method of claim 3, further comprising:
   modifying a compiler to recognize the special pragmas, the compiler performing the steps of rewriting, constructing and linking.

5. The method of claim 3, wherein each special pragma comprises authorization check data for its authorization point.

6. The method of claim 2, wherein identifying authorization points comprises:
   producing a set of associations between authorization points and authorization check data, the step of rewriting being based on the set of associations.

7. The method of claim 2, wherein identifying authorization points comprises:
   constructing a control flow graph for the application module; and
   analyzing the control flow graph to identify authorization points.

8. The method of claim 7, wherein the control flow graph is incomplete.

9. The method of claim 8, further comprising:
   increasing coverage of the control flow graph by tracing execution of the application module under different input data sets.

10. The method of claim 1, further comprising:
    associating a particular authorization check with an identified authorization point.

11. The method of claim 1, wherein a control transfer is implemented with an instruction sequence comprising at least one instruction.

12. The method of claim 11, wherein the instruction sequence causes a runtime exception.

13. The method of claim 12, wherein an address of the instruction sequence uniquely identifies the control transfer.

14. The method of claim 12, wherein an instruction of the instruction sequence is any of: i) an interrupt instruction, and ii) a debug breakpoint instruction.

15. The method of claim 1, wherein each control transfer is uniquely identified.

16. The method of claim 1, wherein a control transfer is implemented with a call to the managed challenge system.

17. The method of claim 16, wherein the call includes a return address that uniquely identifies the control transfer.

18. The method of claim 1, further comprising:
    in the rewritten application module, hiding from an adversary the control transfers to the managed challenge system.

19. The method of claim 18, wherein hiding a control transfer at a particular identified authorization point comprises:
    selecting and removing, for the particular identified authorization point, a set of control transfers whose removal would effectively make finding the authorization point using static analysis impossible.

20. The method of claim 19, wherein selecting and removing a set of control transfers comprises:
    removing one or more control transfers in a manner such that ability of reaching the authorization point is minimized.

21. The method of claim 20, further comprising:
    using a control flow graph to select control transfers for removal.

22. The method of claim 19, wherein the set is selected such that runtime overhead is minimized.

23. The method of claim 19, where removing one of the set of control transfers comprises:
    further rewriting the application module by overwriting the control transfer with a control transfer instruction sequence, the instruction sequence comprising at least one instruction and transferring control, upon its execution, to the managed challenge system; and including in the managed challenge system the overwritten transfer control.

24. The method of claim 1, further comprising:
disabling, if said byte sequence is a valid instruction, any of execution of said dummy code, and
inclusion of said dummy code.

25. The method of claim 1, further comprising:
determining whether said byte sequence is part of another valid instruction; and
including and associating said dummy code responsive to said determination.

26. The method of claim 1, further comprising:
upon failure of the authorization check, performing a specified action.

27. The method of claim 26, wherein the specified action is any of:
i) terminating execution of the application module; and
ii) requesting authorization information from a user.

28. The method of claim 1, further comprising, upon success of the authorization check:
executing the copied certain executable code; and
returning control to the application module.

29. The method of claim 1, further comprising:
in the step of constructing the managed challenge system, modifying the copied certain executable code to account for its displacement from the given application module.

30. The method of claim 1, further comprising: combining the copied certain executable code with code for the authorization check into a single instruction sequence.

31. The method of claim 30, wherein combining comprises:
merging the copied certain executable code with the authorization check code by interspersing their respective instructions into the single instruction sequence.

32. The method of claim 1, further comprising:
obfuscating executable code within the managed challenge system.

33. The method of claim 1, further comprising:
storing, in a table in the managed challenge system, any combination of i) merged code sequences corresponding to authorization points in the application module, ii) hidden code sequences corresponding to removed control transfers in the application module, and iii) dummy code sequences corresponding to non-authorization point code sequences, wherein the table is indexed by a unique identifier associated with each control transfer in the application module.

34. The method of claim 33, further comprising:
encrypting the merged, hidden and dummy code sequences.

35. The method of claim 33, further comprising:
upon transfer of control to the managed challenge system, dynamically generating an executable code sequence from an entry in said table corresponding to an identifier associated with the control transfer from which control was transferred to the managed challenge system.

36. The method of claim 35, further comprising:
maintaining the generated executable code sequences in a code cache of the managed challenge system.

37. The method of claim 36, wherein the code cache is sized such that it is not large enough to simultaneously contain all dynamically created code sequences.

38. The method of claim 35, further comprising:
tracking overhead of dynamically generating an executable code sequence;
based on said tracking overhead, determining whether to undo the step of rewriting.

39. The method of claim 1, wherein the application module is a content protection module.

40. The method of claim 1, wherein different byte sequences are used to transfer control to the managed challenge system from different authorization points in the application module.

41. A computer system for protecting a software application module, comprising:
a coupling tool which rewrites the application module to form a modified application module by overwriting certain executable code at identified authorization points with control transfers to a managed challenge system,
the managed challenge system being application specific and being formed of:
a copy of the certain executable code from the application module before the overwriting, and a runtime task table associating the identified authorization points with authorization check data and with the copied certain executable code, the authorization check data describing an authorization check to be performed upon control reaching the associated authorization point; and
a coupling agent specialized from a coupling agent template, the coupling agent managing the managed challenge system, and the coupling tool linking the managed challenge system to the modified application module and wherein the coupling tool includes, for a byte sequence in the modified application module which matches one of said control transfers and which does not correspond with an identified authorization point, dummy code in the managed challenge system, and associates said dummy code with said byte sequence.

42. The system of claim 41, wherein authorization points are identified by special pragmas used for code/data protection that have been associated with source code of the application module at the authorization points.

43. The system of claim 42, wherein a compiler is modified to recognize the special pragmas, the compiler rewriting the application module, constructing the managed challenge system and linking the application module with the managed challenge system.

44. The system of claim 42, wherein each special pragma comprises authorization check data for its authorization point.

45. The system of claim 41, authorization points being identified with a set of associations between authorization points and authorization check data, the application module being rewritten based on the set of associations.

46. The system of claim 41, further comprising:
an analysis tool which identifies authorization points by constructing a control flow graph for the application module, and analyzes the control flow graph to identify authorization points.

47. The system of claim 46, wherein the control flow graph is incomplete.

48. The system of claim 47, wherein the analysis tool increases coverage of the control flow graph by tracing execution of the application module under different input data sets.

49. The system of claim 41, wherein a control transfer is implemented with an instruction sequence comprising at least one instruction.

50. The system of claim 49, wherein the instruction sequence causes a runtime exception.

51. The system of claim 50, wherein an address of the instruction sequence uniquely identifies the control transfer.

52. The system of claim 50, wherein an instruction of the instruction sequence is any of: i) an interrupt instruction, and ii) a debug breakpoint instruction.

53. The system of claim 41, wherein each control transfer is uniquely identified.

54. The system of claim 41, wherein a control transfer is implemented with a call to the managed challenge system.

55. The system of claim 54, wherein the call includes a return address that uniquely identifies the control transfer.

56. The system of claim 41, the coupling tool further in the modified application module, hiding from an adversary the control transfers to the managed challenge system.

57. The system of claim 56, wherein the coupling tool hides a control transfer at a particular identified authorization point by selecting and removing, for the particular identified authorization point, a set of control transfers whose removal would effectively make finding the authorization point using static analysis impossible.

58. The system of claim 57, wherein the coupling tool selects and removes a set of control transfers by removing one or more control transfers in a manner such that ability of reaching the authorization point is minimized.

59. The system of claim 58, further comprising:
an analysis tool that uses a control flow graph to select control transfers for removal.

60. The system of claim 57, wherein the set is selected such that runtime overhead is minimized.

61. The system of claim 57, wherein one of the set of control transfers is removed by further overwriting the control transfer with a control transfer instruction sequence, and by including in the managed challenge system a copy of the control transfer, wherein the instruction sequence comprises at least one instruction and transfers control, upon its execution, to the managed challenge system.

62. The system of claim 41, wherein, if said byte sequence is a valid instruction, then any of the following is disabled:
execution of said dummy code, and
inclusion of said dummy code.

63. The system of claim 41, wherein the coupling tool includes and associates said dummy code based on a determination as to whether said byte sequence is part of another valid instruction.

64. The system of claim 41, wherein the managed challenge system, upon failure of the authorization check, performs a specified action.

65. The system of claim 64, wherein the specified action is any of:
i) terminating execution of the application module; and
ii) requesting authorization information from a user.

66. The system of claim 41, wherein the managed challenge system, upon success of the authorization check, executes the copy of the certain executable code, and returns control to the application module.

67. The system of claim 41, wherein the copy of the certain executable code is modified to account for its displacement from the application module.

68. The system of claim 41, wherein the coupling tool combines the copy of the certain executable code with code for the authorization check into a single instruction sequence.

69. The system of claim 68, wherein the coupling tool combines the copy of the certain executable code with the authorization check code by merging the copied certain executable code with the authorization check code by interspersing their respective instructions into the single instruction sequence.

70. The system of claim 41, wherein the coupling tool obfuscates executable code within the managed challenge system.

71. The system of claim 41, further comprising:
a protected code store, in which the coupling tool stores any combination of:
i) merged code sequences corresponding to authorization points in the application module,
ii) hidden code sequences corresponding to removed control transfers in the application module, and
iii) dummy code sequences corresponding to non-authorization point code sequences.

72. The system of claim 71, wherein the merged, hidden and dummy code sequences are encrypted.

73. The system of claim 71, wherein the coupling agent comprises:
a dynamic code generator which generates an executable code sequence on demand at run time from a stored code sequence corresponding to an identifier associated with a control transfer from which control was transferred to the managed challenge system.

74. The system of claim 73, wherein the coupling agent further comprises:
a code cache for storing generated code sequences; and
a cache management module which manages the code cache.

75. The system of claim 74, wherein the code cache is sized such that it is not large enough to simultaneously contain all dynamically created code sequences.

76. The system of claim 73, wherein the coupling agent tracks overhead of dynamically generating an executable code sequence, and based on said tracking, determines whether to undo the rewriting of the application module.

77. The system of claim 41, wherein the coupling tool is integrated with a compiler which creates a shared object that includes the managed challenge system and that is linked with the rewritten application module.

78. The system of claim 41, wherein the coupling tool rewrites the application module without access to source code, by instrumenting the application module's executable code.

79. The system of claim 41, wherein the application module is a content protection module.

80. The system of claim 41, wherein different byte sequences are used to transfer control to the managed challenge system from different authorization points in the application module.

81. A computer system for protecting a software application module, comprising:
means for rewriting the application module by overwriting certain executable code at identified authorization points with control transfers to a managed challenge system;
means for constructing the managed challenge system to be specific to the application module, the managed challenge system including a copy of the certain executable code from the application module before the overwriting, the managed challenge system performing an authorization check upon acquiring control from an authorization point; and
means for linking the managed challenge system to the rewritten application module, wherein for a byte sequence in the rewritten application module which matches one of said control transfers and which does not correspond with an identified authorization point, including dummy code in the managed challenge system and associating said dummy code with said byte sequence.

* * * * *